United States Patent [19]
Higurashi et al.

[11] Patent Number: 5,537,619
[45] Date of Patent: Jul. 16, 1996

[54] DIGITAL DATA TRANSMISSION METHOD AND APPARATUS FOR TRANSMITTING DIGITAL DATA AT A HIGH EFFICIENCY

[75] Inventors: Seiji Higurashi, Tokyo; Takeo Ohishi, Yokohama, both of Japan

[73] Assignee: Victor Company of Japan, Ltd., Yokohama, Japan

[21] Appl. No.: 282,584

[22] Filed: Jul. 29, 1994

[30] Foreign Application Priority Data

Jul. 30, 1993 [JP] Japan .................................. 5-208868
Oct. 22, 1993 [JP] Japan .................................. 5-287444

[51] Int. Cl.⁶ ............................................... H04B 1/66
[52] U.S. Cl. ........................... 375/240; 375/241; 348/423; 341/60
[58] Field of Search ................................ 375/240, 241, 375/242, 253; 348/384, 408, 420, 423, 426; 341/60; 370/100.1, 110.1, 110.4, 118; 382/56

[56] References Cited

U.S. PATENT DOCUMENTS

| | | |
|---|---|---|
| 4,907,101 | 3/1990 | Keesen et al. . |
| 5,168,356 | 12/1992 | Acampora et al. ...................... 375/253 |
| 5,173,787 | 12/1992 | Mitani .................................... 348/390 |
| 5,241,382 | 8/1993 | Paik et al. . |
| 5,321,440 | 6/1994 | Yanagihara et al. .................... 348/408 |
| 5,365,272 | 11/1994 | Siracusa ................................ 348/384 |
| 5,410,308 | 4/1995 | Keesen et al. ......................... 348/423 |

FOREIGN PATENT DOCUMENTS

| | | |
|---|---|---|
| 0512623 | 11/1992 | European Pat. Off. . |
| 0540350 | 5/1993 | European Pat. Off. . |
| 0573813 | 12/1993 | European Pat. Off. . |
| 0579075 | 1/1994 | European Pat. Off. . |
| 0629089 | 12/1994 | European Pat. Off. . |

OTHER PUBLICATIONS

Signal Processing of HDTV, III, 4 Sep. 1991, Turin, IT, pp. 33–41, XP 000379936 Kauff et al. 'A DCT Coding Scheme for Digital HDTV Recording.'IEEE Journal on Selected Areas in Communication, vol. 7, No. 5, 1 Jun. 1989, New York US, pp. 807–814, XP 000036749, WADA 'Selective Recovery of Video Packet Loss using Error Concealment'.
IEEE Transactions on Consumer Electronics, vol. 37, No. 3, Aug. 1991, New York US, pp. 275–282, XP 000263196, Yoneda et al. 'An Experimental Digital VCR with new DCT–Based Bit-Rate Reduction System'.
Revue HF Tijdschrift, vol. 15, No. 3/4, 1991, Brussel BE, pp. 102–112, XP 000307855, D'agostino 'Vniversal Video-coded for ATM Networks'.

*Primary Examiner*—Stephen Chin
*Assistant Examiner*—Don Vo
*Attorney, Agent, or Firm*—Lowe, Price, LeBlanc & Becker

[57] ABSTRACT

A method for transmitting pieces of synchronized picture data having the same data length of which each include a synchronizing signal, an identifying code, pieces of compressed picture data having different data lengths and an error correcting code in that order is disclosed. To correctly decode each of the compressed picture data, it is required to start a decoding operation from a head address of each of the compressed picture signal. Therefore, in cases where a head address of a piece of compressed picture data exists in a piece of synchronized picture data, an existence information flag for informing the existence of the head address, an address pointer for indicating an address of the head address, and a block number for indicating a position of the compressed picture data having the head address are added just after the identifying code to correctly decode the compressed picture data and other pieces of following compressed picture data in the synchronized picture data. In contrast, in cases where any head address does not exist, a no-existence information flag for informing the no-existence of the head address is merely added just after the identifying code.

17 Claims, 11 Drawing Sheets

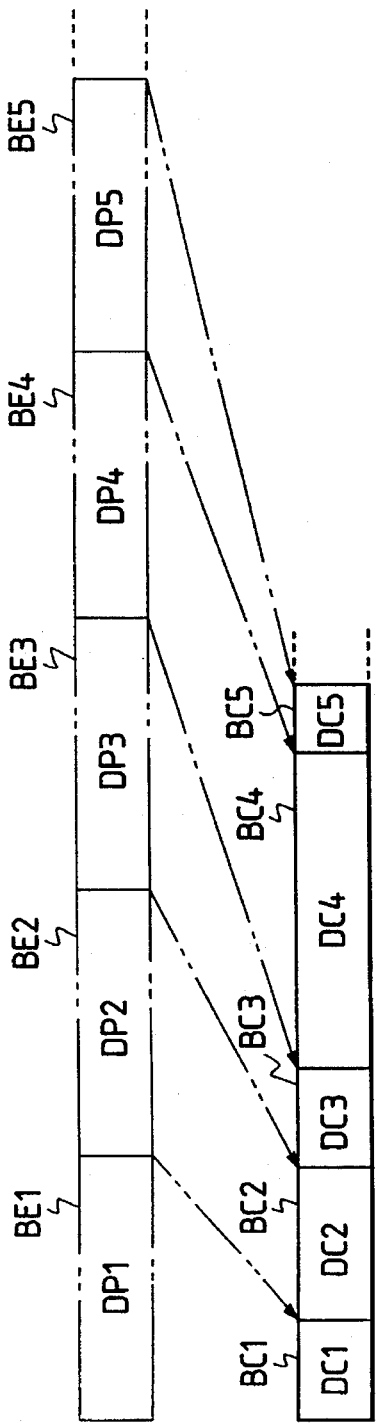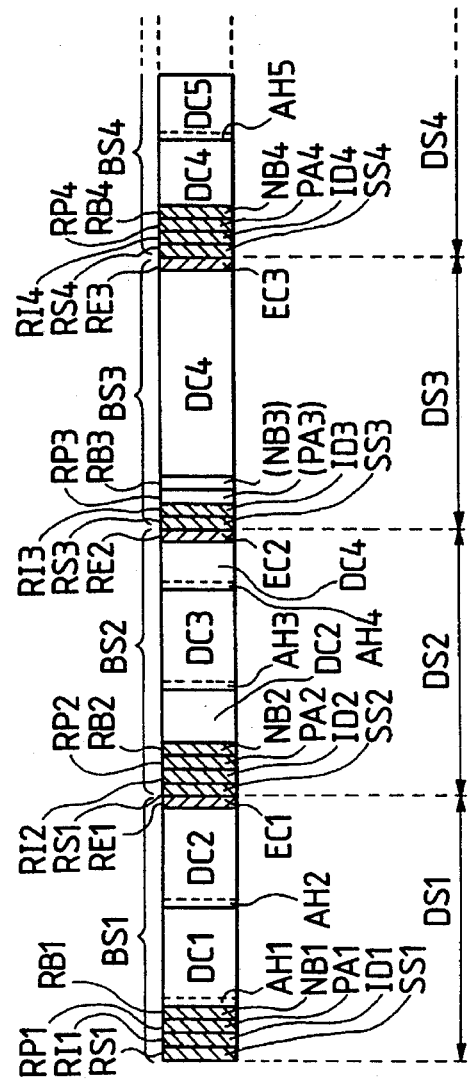
FIG. 2(a) PRIOR ART
FIG. 2(b) PRIOR ART
FIG. 2(c) PRIOR ART

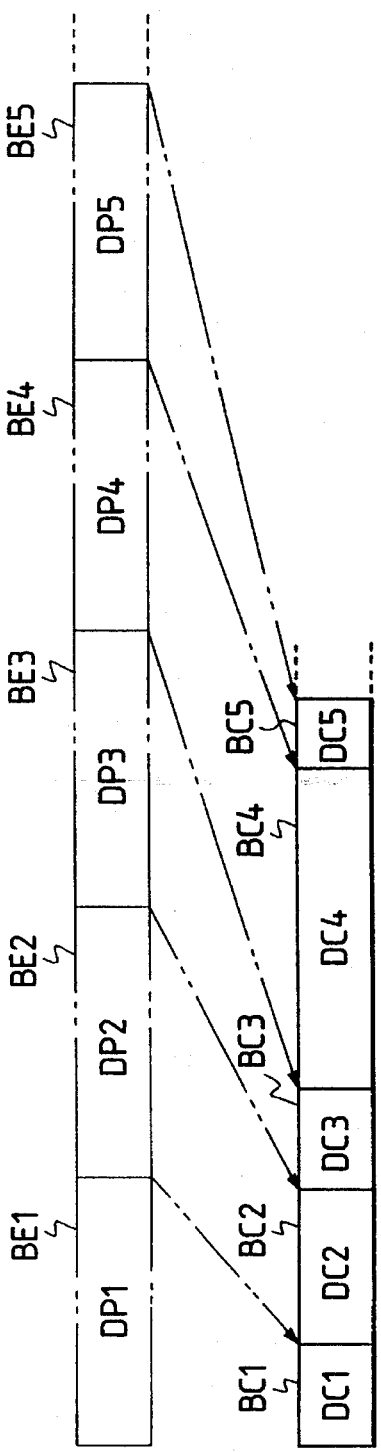
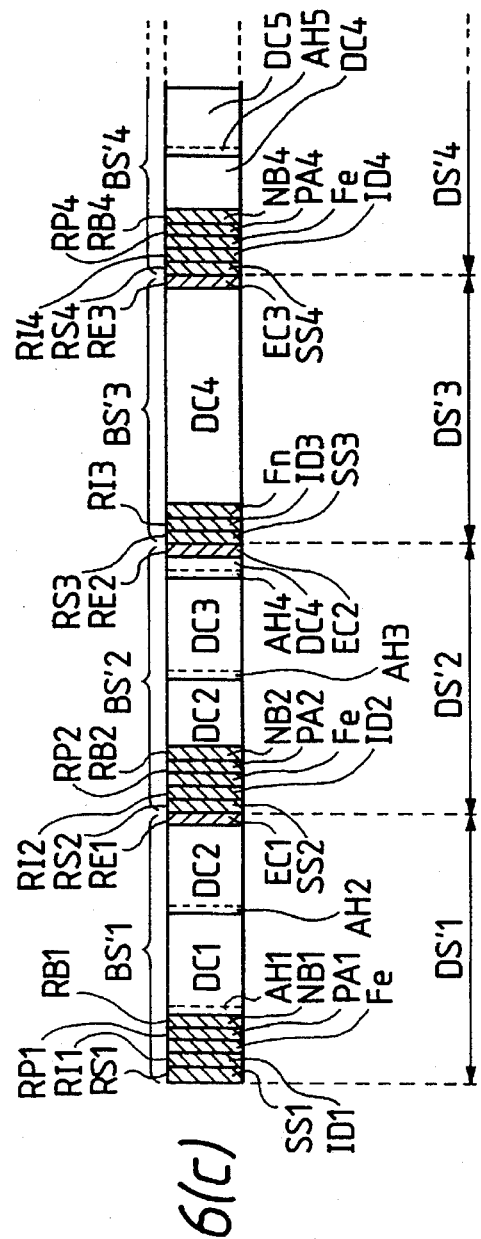
FIG. 6(a)
FIG. 6(b)
FIG. 6(c)

DIGITAL DATA TRANSMISSION METHOD AND APPARATUS FOR TRANSMITTING DIGITAL DATA AT A HIGH EFFICIENCY

BACKGROUND OF THE INVENTION

1. Field of the Invention

The present invention relates to digital data transmission method and apparatus for transmitting a band-compressed digital signal such as a picture signal or an audio signal to record and reproduce the digital signal.

2. Description of the Prior Art

2.1. Previously Proposed Art

A digital data transmission apparatus has been utilized to transmit a band-compressed digital information signal such as a picture signal or an audio signal. FIG. 1 is a block diagram of a conventional digital data transmission apparatus. As shown in FIG. 1, a conventional digital data transmission apparatus 11 comprises a transmitting system 12 for processing a digital picture signal representing a digital information signal, a transmission path 13 for transmitting the digital picture signal processed in the system 12, and a receiving system 14 for processing the digital picture signal transmitted through the transmission path 13. The processing in the transmitting system 12 and the processing in the receiving system 14 are complementary to each other.

A digital picture signal designating a frame of picture data Dp is input to a signal dividing section 15 of the system 12. Thereafter, as shown in FIG. 2(a), the digital picture signal is divided into pieces of partial picture data DPi (i=1,2, - - -, the same shall apply hereinafter). The partial picture data DPi are respectively composed of 64 pixels (8 pixels in a lateral direction ×8 pixels in a longitudinal direction) to be orthogonally converted and are allocated in a plurality of encoded blocks BEi. Thereafter, the partial picture data DPi are transferred to an orthogonal converting section 16 and are orthogonally converted into pieces of converted picture data in each of the encoded blocks. For example, a discrete cosine transformation is performed for each of the partial picture data DPi. In this case, energy is concentrated on lower frequency components of the converted picture data according to statistical properties of the picture signal. Thereafter, the converted picture data are transferred to a quantizing and variable-length encoding section 17.

In the section 17, the converted picture data are adaptively quantized to produce pieces of quantized data according to a predicted dynamic range and a predicted length of data obtained by quantizing and encoding the converted picture data in variable-length. Thereafter, the quantized data are encoded in variable-length and are encoded in run-length in the section 17. Therefore, a total length of the converted picture data is reduced in the section 17. In other words, the converted picture data are compressed to produce pieces of compressed picture data DCi allocated in a plurality of compressed blocks BCi in the section 17. Thereafter, the compressed picture data DCi are transferred to a synchronizing-identifying-error correcting codes adding section 18.

In the section 18, as shown in FIG. 2(c), a group of compressed picture data DCi is equally divided into pieces of divided picture data which each has the same synchronizing data length. The divided picture data are allocated in a plurality of synchronizing blocks BSi which are formed according to the same format. Also, a synchronizing signal SSi, an identifying code IDi, an address pointer PAi and a block address such as a block number NBi are added in a synchronizing signal region RSi, an identifying code region RIi, an address pointer region RPi and a block number region RBi which are placed in a head portion of each of the synchronizing blocks BSi. Also, an error correcting code ECi is added in an error correcting code region REi placed in a rear portion of each of the synchronizing blocks BSi. Therefore, pieces of synchronized picture data DSi respectively composed of the synchronizing signal SSi, the identifying code IDi, the address pointer PAi, the block number NBi, a piece of divided picture data and the error correcting code ECi are allocated in the synchronizing blocks BSi. Thereafter, the synchronized picture data DSi are recorded in a recording medium 19 through the transmission path 13. Therefore, the compressed picture data DCi with the synchronizing signal SSi, the identifying code IDi, the address pointer PAi, the block number NBi and the error correcting code ECi are recorded in the recording medium 19.

In cases where the compressed picture data DCi are reproduced from the recording medium 19, the synchronized picture data DSi recorded are transmitted to a synchronizing-identifying-codes separating and error correcting section 20 of the receiving system 14 through the transmission path 13. In this case, a transmission error occurs in the compressed picture data DCi of the synchronized picture data DSi at a prescribed probability. Therefore, the transmission error is deleted in the section 20. In detail, the synchronizing blocks BSi are recognized according to the synchronizing signals SSi and the identifying codes IDi, and the compressed picture data DCi included in the synchronizing picture data DSk are recognized according to the address pointer PAk and the block number NBk. Thereafter, an error correction is performed to delete the transmission error occurring in the compressed picture data DCi of the synchronizing picture data DSk according to the error correcting code ECk. Thereafter, the synchronizing signals SSi, the identifying codes IDi, the address pointers PAi, the block numbers NBi and the error correcting codes ECi are separated from the synchronized picture data DSi to correctly reproduce the compressed picture data DCi. Thereafter, the compressed picture data DCi are transferred to a variable-length decoding and inverse quantizing section 21 in sequence. In the section 21, the compressed picture data DCi coded in the variable-length are decoded and inversely quantized to reproduce the converted picture data in sequence. Thereafter, the converted picture data reproduced are transferred to an inverse orthogonal converting section 22 and are inversely converted according to an inverse orthogonal conversion to reproduce the partial picture data DPi. Thereafter, the partial picture data DPi reproduced are transferred to a signal synthesizing section 23, and the digital picture signal designating the picture data Dp are reproduced by synthesizing the partial picture data DPi in order of the block number and are output.

In the above operation of the conventional digital data transmission apparatus 11, each length of the compressed picture data DCi produced in the quantizing and variable-length encoding section 17 depends on contents of a piece of corresponding partial picture data DPi. Therefore, the lengths of the compressed picture data DCi differ from each other, and the compressed blocks BCi are not fixed to the same size. Also, in cases where the compressed picture data DCi are transmitted, recorded or reproduced, it is required to prevent the occurring of errors in the compressed picture data DCi. Therefore, a group of compressed picture data DCi is equally divided in a prescribed length in the synchronizing-identifying-error correcting codes adding section 18, and the signal and codes SSi, IDi, PAi, NBi and ECi are added to each of the divided picture data having the prescribed length. As a result, the synchronizing blocks BSi are fixed to the same size.

Accordingly, the size of the synchronizing blocks BSi is not the same as those of the compressed blocks BCi. In other words, a piece of compressed picture data DCj (j is a positive integer) allocated in a compressed block BCj is sometimes divided into first and second parts, and the first part of compressed picture data DCj is allocated in a synchronizing block BSk (k is a positive integer) while the second part of compressed picture data DCj is allocated in a synchronizing block BSk+1 adjacent to the synchronizing block BSk. Also, a piece of divided picture signal is sometimes composed of a part of the compressed picture data DCj.

For example, as shown in FIG. 2(c), the synchronized picture data DS1 is composed of a synchronizing signal SS1, an identifying code ID1, an address pointer PA1 and a block number NB1, the compressed picture data DC1, a first part of the compressed picture data DC2 and an error correcting code EC1 in that order. The synchronized picture data DS2 is composed of a synchronizing signal SS2, an identifying code ID2, an address pointer PA2 and a block number NB2, the remaining part of the compressed picture data DC2, the compressed picture data DC3, a first part of the compressed picture data DC4 and an error correcting code EC2 in that order. The synchronized picture data DS3 is composed of a synchronizing signal SS3, an identifying code ID3, an address pointer PA3 and a block number NB3, a second part of the compressed picture data DC4 and an error correcting code EC3 in that order. The synchronized picture data DS4 is composed of a synchronizing signal SS4, an identifying code ID4, an address pointer PA4 and a block number NB4, the remaining part of the compressed picture data DC4, a part of the compressed picture data DC5 and an error correcting code EC4 in that order.

In cases where the compressed picture data DCi are decoded in the decoding section 21, it is required to start a decoding operation from each of head portions of the compressed picture data DCi for the purpose of correctly decoding the compressed picture data DCi. In other words, in cases where a decoding operation is started from a middle portion of a piece of compressed picture data DCj, the decoded part of the compressed picture data DCj does not make sense. Therefore, it is required to recognize each of the head portions of the compressed picture data DCi as a decoding operation starting point. To correctly decode the compressed picture data DCi, each of the compressed picture data DCi has a head address placed in its head portion. For example, as shown in FIG. 2(c), head addresses AHi are placed in the head portions of the compressed picture data DCi. Because the head addresses AH1, AH2 exist in the synchronizing block BS1, the compressed picture data DC1 and the first part of the compressed picture data DC2 are correctly decoded after the head addresses AH1, AH2 are recognized, and the remaining part of the compressed picture data DC2 is correctly decoded after the first part of the compressed picture data DC2 is correctly decoded. Also, because the head addresses AH3, AH4 exist in the synchronizing block BS2, the compressed picture data DC3 and the first part of the compressed picture data DC4 are correctly decoded after the head addresses AH3, AH4 are recognized, and the second and remaining parts of the compressed picture data DC4 are correctly decoded after the first part of the compressed picture data DC4 is correctly decoded. Also, because the head address AH5 exists in the synchronizing block BS4, the compressed picture data DC5 is correctly decoded after the head address AH5 is recognized. Therefore, in cases where the synchronized picture data DS1, DS2, DS3 and DS4 are reproduced from the recording medium 19 in that order, the compressed picture data DCi included in the synchronized picture data DSi can be correctly decoded.

Also, it is not necessarily sure that all of the compressed picture data DCi are transmitted through the transmission path 13, recorded in the recording medium 19 or reproduced from the recording medium 19. Also, a positional relationship among the partial picture data DPi are not necessarily the same as that among the compressed picture data DCi. For example, even though a piece of partial picture data DPj in a group of partial picture data DPi having a total length is placed at a particular position spaced at $1/10$ of the total distance from a head portion of the group of partial picture data DPi, a piece of compressed picture data DCj obtained from the partial picture data DPj is not necessarily placed at the particular position spaced at $1/10$ of a compressed total distance from a head portion of a group of compressed picture data DCi having the compressed total length. Therefore, it is required to add pieces of correspondence information at regular intervals to indicate the correspondence of the partial picture data DPi and the compressed picture data DCi. Also, it is required to add pieces of starting point information at the regular intervals to indicate the head addresses AHi of the compressed picture data DCi.

In the conventional digital data transmission apparatus 11, as shown in FIG. 3, an address pointer PAk allocated at an address pointer region RPk is added to the synchronized picture data DSk as the starting point information to preliminarily indicate a head address AHk of a piece of compressed picture data DCj which is first placed in a series of compressed picture data DCi having the head addresses AHi in the synchronized picture data DSk. Therefore, a decoding operation is started from the head address AHk to correctly decode the series of compressed picture data DCi. Also, a block number NBk allocated at a block number region RBk is added to the synchronized picture data DSk as the correspondence information to indicate the number of the compressed picture data DCj. Therefore, a position of the compressed picture data DCj in the synchronized picture data DSk is recognized. For example, in cases where the compressed picture data DC1, DC2 of the synchronizing block BS1 are decoded, the address pointer PA1 allocated at the address pointer region RP1 and the block number NB1 allocated at the block number region RB1 are read to recognize the head address AH1 of the compressed picture data DC1, and a decoding operation is performed from the head address AH1 of the compressed picture data DC1. Therefore, because an end address of the compressed picture data DC1 is recognized, the head address AH2 of the compressed picture data DC2 is automatically recognized, and a following decoding operation is performed from the head address AH2 of the compressed picture data DC2. In cases where the compressed picture data DC3, DC4 of the synchronizing block BS2 are decoded, the address pointer PA2 allocated at the address pointer region RP2 and the block number NB2 allocated at the block number region RB2 are read to recognize the head address AH3, and a decoding operation is performed from the head address AH3 of the compressed picture data DC3. Therefore, because an end address of the compressed picture data DC3 is recognized, the head address AH4 of the compressed picture data DC4 is automatically recognized, and a following decoding operation is performed from the head address AH4 of the compressed picture data DC4. In cases where the compressed picture data DC5 of the synchronizing block BS4 is decoded, the address pointer PA4 allocated at the address pointer region RP4 and the block number NB4 allocated at the block number region RB4 are read to recognize the head address AH5, and a decoding operation is performed from the head address AH5 of the compressed picture data DC5.

Therefore, even though the synchronized picture data DS1, DS2, DS3 and DS4 are not reproduced from the recording medium 19 in that order, the head addresses AHi of the compressed picture data DCi can be recognized by reading the address pointers PAi and the block numbers NBi, and the compressed picture data DCi included in the synchronized picture data DSi can be correctly decoded. Accordingly, the decoding of the compressed picture data DCi can be performed regardless of whether or not the synchronized picture data DS1, DS2, DS3 and DS4 are reproduced in that order.

2.2. Problems to be Solved by the Invention

However, because any head address does not exist in the synchronizing block DS3, any address pointer is not written in the address pointer region RP3, and any block number is not written in the block number region RB3. That is, the address pointer region RP3 and the block number region RB3 are in an empty condition. Because the lengths of the compressed picture data DCi depend on contents of the partial picture data DPi while a group of compressed picture data DCi is equally divided in a prescribed length to produce the synchronized picture data DSi, the empty condition often occurs in the conventional digital data transmission apparatus 11. Therefore, because the address pointer regions RPi and the block number regions RBi set in the empty condition are not effectively utilized, there is a first drawback that a frame of picture data Dp input to the apparatus 11 cannot be compressed with a high efficiency.

Also, one or more pieces of important data DI included in a piece of converted picture data are generally placed in a front area of each of the encoded blocks BEi. In the important data DI, energy is concentrated. For example, in cases where the partial picture data DPi are converted into the converted picture data in the orthogonal converting section 16, converting coefficients for lower frequency components such as a DC coefficient are placed in the front areas of the encoded blocks BEi. Therefore, the important data DI represented by the converting coefficients are placed in a front area of each of the compressed blocks BCi. For example, as shown in FIG. 4A, the important data in the partial picture data DP1 are gathered in a front area AF1 of the compressed block BC1, the important data in the partial picture data DP2 are gathered in a front area AF2 of the compressed block BC2, the important data in the partial picture data DP3 are gathered in a front area AF3 of the compressed block BC3, the important data in the partial picture data DP4 are gathered in a front area AF4 of the compressed block BC4, and the important data in the partial picture data DP5 are gathered in a front area AF5 of the compressed block BC5. In this case, as shown in FIG. 4B, because a front area subsequent to the synchronizing signal region RSj and the identifying code region RIj in the synchronizing block BSj is not necessarily occupied by the important data DI.

In cases where the compressed picture data DCi recorded in the recording medium 19 are reproduced according to a special reproducing mode (or a high speed searching mode) in the conventional digital data transmission apparatus 11 utilized in a video tape recorder, all of the compressed data DCi included in a synchronizing block BSj are not necessarily reproduced. In this case, because one or more pieces of front data allocated in a front area following the synchronizing signal region RSj and the identifying code region RIj in the synchronizing block BSj are correctly reproduced at the highest probability, the front data are generally reproduced according to the special reproducing mode. However, because the front area is not necessarily occupied by the important data DI, the important data DI are not necessarily reproduced according to the special reproducing mode. Therefore, there is a second drawback that the reproduction according to the special reproducing mode cannot be performed at a high reproductivity.

SUMMARY OF THE INVENTION

A first object of the present invention is to provide, with due consideration to the drawbacks of such a conventional digital data transmission method and apparatus, a digital data transmission method in which a frame of picture data Dp is compressed with a high efficiency. Also, the first object is to provide a digital data transmission apparatus in which the digital data transmission method is performed.

A second object of the present invention is to provide a digital data transmission method in which the reproduction of a frame of picture data Dp is performed at a high reproductivity regardless of a reproducing mode such as a special reproducing mode. Also, the second object is to provide a digital data transmission apparatus in which the digital data transmission method is performed.

The first object is achieved by the provision of a digital data transmission method for transmitting pieces of synchronized information data having the same data length of which each include a synchronizing signal, pieces of compressed information data having different data lengths and an error correcting code, comprising the steps of;

judging whether or not a piece of particular compressed information data having a head address exists in a piece of synchronized information data;

storing a piece of existence information indicating the existence of the particular compressed information data in the synchronized information data in cases where it is judged that the particular compressed information data having the head address exists;

storing both a piece of address pointing information indicating a particular position of the head address of the particular compressed information data and a piece of positional information indicating a data position of the particular compressed information data in the synchronized information data in cases where it is judged that the particular compressed information data having the head address exists, the particular compressed information data and other pieces of compressed information data subsequent to the particular compressed information data of the synchronized information data being decoded in sequence from the head address of the particular compressed information data; and storing a piece of no-existence information indicating that the particular compressed information data with the head address does not exist in the synchronized information data in cases where it is judged that the particular compressed information data having the head address does not exist, a rear part of a piece of single-placed compressed information data being included in the synchronized information data.

A synchronizing signal, one or more pieces of compressed information data sequentially arranged and an error correcting code are included in that order in each of pieces of synchronized information data, and the synchronized information data are sequentially transmitted and recorded in a recording medium. Thereafter, the synchronized information data recorded are reproduced and transmitted to decode the compressed information data included in the synchronized information data. In this case, to correctly decode each of the compressed information data, it is required to perform a decoding operation from a head address of each of the compressed information data.

In the above steps of the present invention, it is judged whether or not a piece of particular compressed information data having a head address exists in a piece of k-th ordered synchronized information data.

In cases where a fore part of a piece of first-ordered compressed information data placed in a first position among the compressed information data of the k-th ordered synchronized information data is not included in the k-th ordered synchronized information data, a head address of the first-ordered compressed information data does not exist in the k-th ordered synchronized information data but exists in a piece of (k-1)-th ordered synchronized information data. Therefore, the fore part of the first-ordered compressed information data is decoded by performing a decoding operation in the (k-1)-th ordered synchronized information data. Thereafter, a remaining part of the first-ordered compressed information data is decoded in the k-th ordered synchronized information data. Thereafter, in cases where a piece of second-ordered compressed information data is included in the k-th ordered synchronized information data, the second-ordered compressed information data is regarded as the particular compressed information data having a head address.

Thereafter, a piece of existence information indicating the existence of the particular compressed information data with the head address is stored in the k-th ordered synchronized information data. Also, both a piece of address pointing information indicating a particular position of the head address of the particular compressed information data and a piece of positional information indicating a data position of the particular compressed information data are stored in the k-th ordered synchronized information data.

Therefore, the existence of the particular compressed information data can be quickly and reliably recognized by detecting the existence information in a reproducing operation. Thereafter, a data position of the particular compressed information data and a particular position of the head address of the particular compressed information data are recognized according to the positional information and the address pointing information.

Thereafter, the second-ordered compressed information data regarded as the particular compressed information data and other pieces of compressed information data subsequent to the second-ordered compressed information data are decoded in the reproducing operation on condition that another decoding operation is additionally started from a head address of the second-ordered compressed information data. In contrast, in cases where a piece of second-ordered compressed information data is not included in the k-th ordered synchronized information data, it is regarded that a piece of particular compressed information data having a head address does not included in the k-th ordered synchronized information data, and another decoding operation is not required any more.

Therefore, a piece of no-existence information indicating that the particular compressed information data with the head address does not exist in the k-th ordered synchronized information data is stored in the k-th ordered synchronized information data. Accordingly, it can be quickly and reliably recognized that another decoding operation is not required any more. Also, any positional information and address pointing information are not stored in the k-th ordered synchronized information data because any particular compressed information data does not exist in the k-th ordered synchronized information data. Accordingly, the compressed information data can be efficiently placed in the synchronized information data because an area for the positional information and the address pointing information is not required.

In contrast, in cases where a fore part of the first-ordered compressed information data of the k-th ordered synchronized information data is included in the k-th ordered synchronized information data, the first-ordered compressed information data is regarded as the particular compressed information data having a head address because a head address of the first-ordered compressed information data exists in the k-th ordered synchronized information data, and all of the compressed information data of the k-th ordered synchronized information data are decoded on condition that a decoding operation is started from the head address of the first-ordered compressed information data. Thereafter, the existence information, the address pointing information and the positional information are stored in the k-th ordered synchronized information data in the same manner.

Therefore, the existence of the particular compressed information data can be quickly and reliably recognized by detecting the existence information in a reproducing operation, and a data position of the particular compressed information data and a particular position of the head address of the particular compressed information data are recognized according to the positional information and the address pointing information.

Thereafter, the first-ordered compressed information data regarded as the particular compressed information data and other pieces of compressed information data subsequent to the first-ordered compressed information data are decoded in the reproducing operation.

Accordingly, because the existence information or no-existence information is stored in the synchronized information data, the recognition of whether or not a piece of particular compressed information data having a head address exists in the synchronized information data can be quickly and reliably performed.

Also, because either a piece of positional information or a piece of address pointing information is not stored in the synchronized information data in cases where it is judged that the particular compressed information data having the head address does not exist, the compressed information data can be efficiently stored in the synchronized information data.

The first object is also achieved by the provision of a digital data transmission apparatus for transmitting pieces of synchronized information data having the same data length of which each include a synchronizing signal, pieces of compressed information data having different data lengths and an error correcting code, comprising;

starting position detecting means for detecting a head address of a piece of particular compressed information data as a starting position to decode the particular compressed information data from the starting position, producing a piece of existence information indicating the existence of the head address of the particular compressed information data in cases where the head address of the particular compressed information data is detected, producing both a piece of address pointing information indicating a particular position of the head address of the particular compressed information data and a piece of positional information indicating a data position of the particular compressed information data in cases where the head address of the particular compressed information data is detected, and producing a piece of no-existence information indicating no-existence of the head address of the particular compressed information data in cases where the head address of the particular compressed information data is not detected;

auxiliary memory means for storing the existence information, the address pointing information and the positional information produced in the starting position detecting means in cases where the head address of the particular compressed information data is detected in the starting position detecting means and storing the no-existence information produced in the starting position detecting means in cases where the head address of the particular compressed information data is not detected in the starting position detecting means;

main memory means for storing the particular compressed information data and one or more pieces of succeeding compressed information data subsequent to the particular compressed information data in cases where the head address of the particular compressed information data is detected in the starting position detecting means and storing a rear part of a piece of single-spaced compressed information data in cases where the head address of the particular compressed information data is detected in the starting position detecting means, a bit length of the rear part of the single-spaced compressed information data being longer than a total bit length of the particular compressed information data and the succeeding compressed information data by a bit length of both the address pointing information and the positional information; and memory reading control means for reading out the existence information, the address pointing information and the positional information stored in the auxiliary memory means and the particular compressed information data and the succeeding compressed information data stored in the main memory in that order to arrange the existence information, the address pointing information and the positional information, the particular compressed information data and the succeeding compressed information data in that order as a piece of synchronized information data in cases where the head address of the particular compressed information data is detected in the starting position detecting means, and reading out the no-existence information stored in the auxiliary memory means and the rear part of the single-paced compressed information data stored in the main memory in that order to arrange the no-existence information and the rear part of the single-paced compressed information data in that order as a piece of synchronized information data in cases where the head address of the particular compressed information data is not detected in the starting position detecting means.

In the above configuration, a head address of a piece of particular compressed information data is detected in the starting position detecting means. In cases where the particular compressed information data is decoded from its head address, the particular compressed information data is correctly decoded. Therefore, the head address denotes a starting position of a decoding operation.

In cases where the head address is detected in the starting position detecting means, a piece of existence information indicating the existence of the head address, a piece of address pointing information indicating a particular position of the head address and a piece of positional information indicating a data position of the particular compressed information data produced in the starting position detecting means are stored in the auxiliary memory means. Also, the particular compressed information data and one or more pieces of succeeding compressed information data subsequent to the particular compressed information data are stored in the main memory. Thereafter, the existence information, the address pointing information, the positional information, the particular compressed information data and the succeeding compressed information data are read out from the main and auxiliary memory means under the control of the memory reading control means to arrange the data and information in that order as a piece of synchronized information data.

In contrast, in cases where the head address is not detected in the starting position detecting means, a piece of no-existence information indicating no-existence of the head address is stored in the auxiliary memory means. Also, a rear part of a piece of single-paced compressed information data is stored in the main memory. Thereafter, the no-existence information and the single-paced compressed information data are read out from the main and auxiliary memory means under the control of the memory reading control means to arrange the data and information in that order as a piece of synchronized information data.

In this case, a total bit length of the existence information, the address pointing information, the positional information, the particular compressed information data and the succeeding compressed information data is equal to that of the no-existence information and the single-paced compressed information data to form the synchronized information data having a fixed data length. Therefore, a data length of the single-paced compressed information data becomes longer than that of the particular compressed information data and the succeeding compressed information data.

Accordingly, a ratio of the compressed information data to the information can be increased in cases where the head address is not detected, so that the compressed information data can be compressed and recorded with a high efficiency.

The second object is achieved by the provision of a digital data transmission method for transmitting pieces of synchronized information data having the same data length of which each include a synchronizing signal, pieces of compressed information data having different data lengths and an error correcting code in that order, comprising the steps of;

judging whether or not a piece of particular compressed information data having a head address exists in a piece of synchronized information data;

arranging pieces of important compressed data placed at front areas of the particular compressed information data and other pieces of compressed information data subsequent to the particular compressed information data in the synchronized information data to an important synchronizing area just after a synchronizing signal area of the synchronizing signal in cases where it is judged that the particular compressed information data having the head address exists;

arranging pieces of ordinary compressed data placed at remaining areas of the particular compressed information data and the other compressed information data in the synchronized information data at an ordinary synchronizing area subsequent to the important synchronizing area in cases where it is judged that the particular compressed information data having the head address exists; and arranging a rear part of a piece of single-placed compressed information data of the synchronized information data at an ordinary synchronizing area just after a synchronizing signal area of the synchronizing signal in cases where it is judged that the particular compressed information data having the head address does not exist.

A synchronizing signal, one or more pieces of compressed information data sequentially arranged and an error correcting code are included in that order in each of pieces of synchronized information data, and the synchronized information data are sequentially transmitted and recorded in a recording medium. Thereafter, the synchronized information data recorded are reproduced and transmitted to decode the compressed information data included in the synchronized information data. In this case, each of the compressed information data is composed of a piece of important compressed data and a piece of ordinary compressed data. The important compressed data is placed at a front area of the compressed information data according to statistic properties of the information data. Therefore, because one or more pieces of compressed information data are arranged in series in a piece of synchronized information data, pieces of important compressed data of the compressed information data are not gathered at a synchronized front area of a group of compressed information data subsequent to an area of the synchronizing signal. However, pieces of data placed at the synchronized front area can be correctly reproduced at a high probability without any transmission error.

In the above steps of the present invention, it is judged whether or not a piece of particular compressed information data having a head address exists in a piece of synchronized information data. In cases where the particular compressed information data having the head address exists in the synchronized information data, there is a piece of important compressed data placed at a front area of the particular compressed information data. Therefore, in this case, pieces of important compressed data placed at front areas of the particular compressed information data and other pieces of compressed information data subsequent to the particular compressed information data in the synchronized information data are arranged in an important synchronizing area just after a synchronizing signal area of the synchronizing signal. Thereafter, pieces of ordinary compressed data of the particular compressed information data and other compressed information data are arranged at an ordinary synchronizing area subsequent to the important synchronizing area.

Accordingly, the important compressed data can be correctly reproduced at a high probability.

In contrast, in cases where the particular compressed information data having the head address does not exist in the synchronized information data, there is no piece of important compressed data. Therefore, in this case, a rear part of a piece of single-placed compressed information data of the synchronized information data is arranged at an ordinary synchronizing area just after a synchronizing signal area of the synchronizing signal.

The second object is also achieved by the provision of a digital data transmission apparatus for transmitting pieces of synchronized information data having the same data length of which each include a synchronizing signal, pieces of compressed information data having different data lengths and an error correcting code in that order, comprising;

starting position detecting means for detecting a starting position of a piece of particular compressed information data to decode the particular compressed information data and one or more pieces of succeeding compressed information data subsequent to the particular compressed information data from the starting point, producing a piece of existence information indicating the existence of the starting point, producing a piece of address pointing information indicating an address of the starting position, and producing a piece of positional information indicating a data position of the particular compressed information data;

first memory means for storing the existence information, the address pointing information and the positional information produced in the starting position detecting means;

second memory means for storing pieces of important compressed data included in fore portions of the particular compressed information data and the succeeding compressed information data;

third memory means for storing pieces of ordinary compressed data included in remaining portions of the particular compressed information data and the succeeding compressed information data; and memory reading control means for reading out the existence information, the address pointing information and the positional information stored in the first memory means, the important compressed data stored in the second memory means and the ordinary compressed data stored in the third memory means in that order to arrange the existence information, the address pointing information, the positional information, the important compressed data and the ordinary compressed data in that order as a piece of synchronized information data.

In the above configuration, a starting position of a piece of particular compressed information data is detected in the starting position detecting means. In cases where the particular compressed information data and one or more pieces of succeeding compressed information data subsequent to the particular compressed information data are decoded from its starting position, the particular compressed information data and the succeeding compressed information data are correctly decoded. Thereafter, a piece of existence information indicating the existence of the starting point, a piece of address pointing information indicating an address of the starting position and a piece of positional information indicating a data position of the particular compressed information data are produced in the starting position detecting means and are stored in the first memory means.

Also, pieces of important compressed data included in fore portions of the particular compressed information data and the succeeding compressed information data are stored in the second memory means, and pieces of ordinary compressed data included in remaining portions of the particular compressed information data and the succeeding compressed information data are stored in the third memory means.

Thereafter, the existence information, the address pointing information, the positional information, the important compressed data and the ordinary compressed data are read from the first, second and third memory means under the control of the memory reading control means to arrange the data in that order as a piece of synchronized information data.

Accordingly, because the important compressed data can be concentratedly placed just after pieces of control information composed of the existence information, the address pointing information and the positional information, the important compressed data can be reliably decoded in a decoding operation.

BRIEF DESCRIPTION OF THE DRAWINGS

The objects, features and advantages of the present invention will be apparent from the following description taken in conjunction with the accompanying drawings, in which:

FIGS. 2(a), 2(b) and 2(c) show a frame of picture data which is divided, compressed and equally divided while adding various signal and codes;

FIGS. 6(a), 6(b) and 6(c) show a frame of picture data which is divided, compressed and equally divided while adding various signal and codes in the digital data transmission apparatus shown in FIG. 5 according to the first embodiment of the present invention;

DESCRIPTION OF THE PREFERRED EMBODIMENTS

Preferred embodiments of digital data transmission method and apparatus according to the present invention are described with reference to drawings.

Constitutional elements, signals and data which are identical with the constitutional elements, signals and data shown in FIGS. 1 to 4 are represented by the same reference signs as those shown in FIGS. 1 to 4.

A digital data transmission method and apparatus in which the first drawback is solved is described according to a first embodiment of the present invention.

Figure 5:
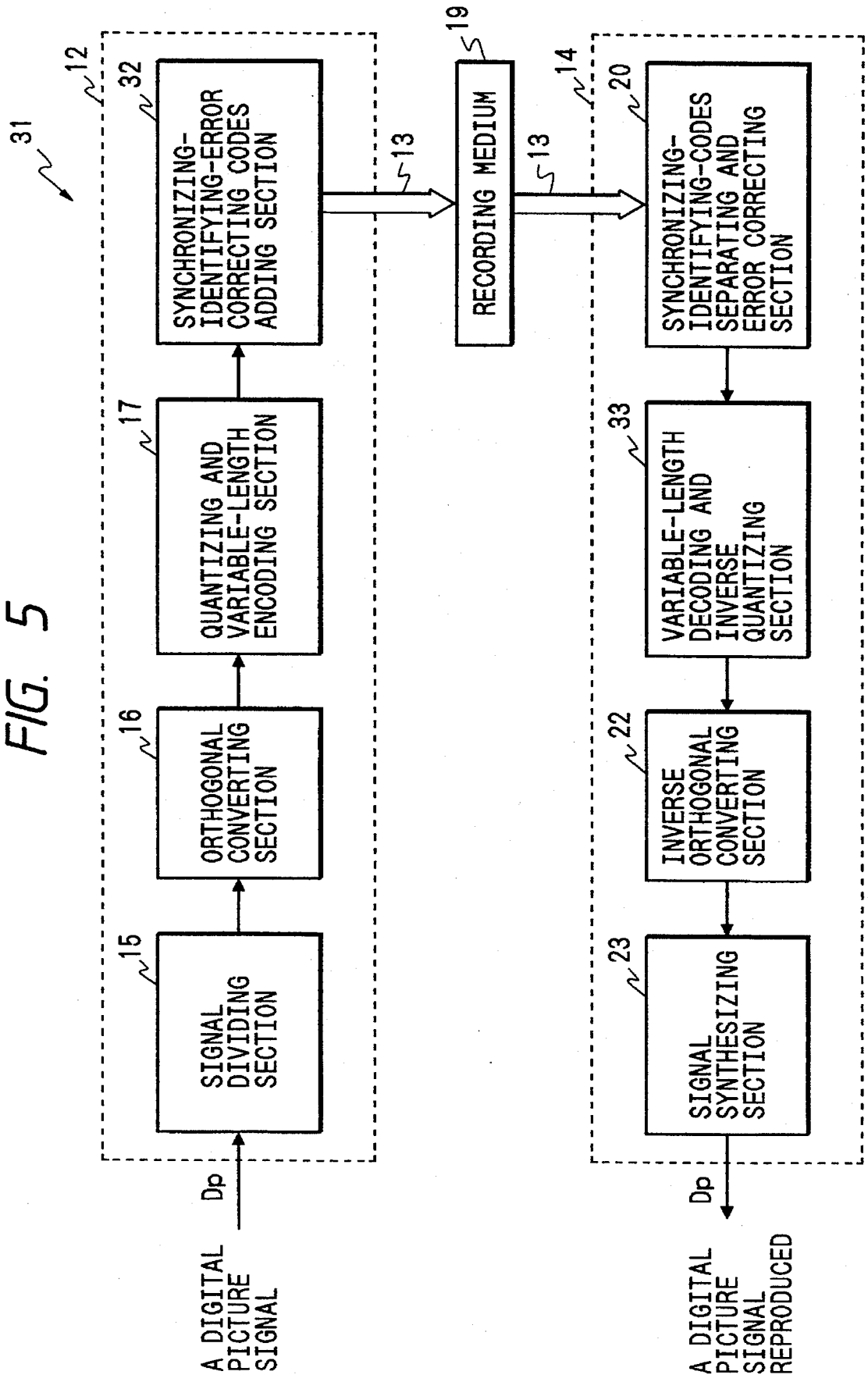
FIG. 5 is a block diagram of a digital data transmission apparatus according to a first embodiment of the present invention.

FIG. 5 is a block diagram of a digital data transmission apparatus according to a first embodiment of the present invention.

As shown in FIG. 5, a digital data transmission apparatus 31 comprises the signal dividing section 15, the orthogonal converting section 16, the quantizing and variable-length encoding section 17, a synchronizing-identifying-error correcting codes adding section 32, the transmission path 13, a synchronizing-identifying-codes separating and error correcting section 20, the variable-length decoding and inverse quantizing section 33, the inverse orthogonal converting section 22, and the signal synthesizing section 23.

In the above configuration, a digital picture signal which represents a digital information signal and designates a frame of picture data Dp is input to the signal dividing section 15, and the digital picture signal is divided into pieces of partial picture data DPi (i=1,2, - - - ) as shown in FIG. 6(a). The partial picture data DPi are respectively composed of 64 pixels (8 pixels in a lateral direction ×8 pixels in a longitudinal direction) to be orthogonally converted and are allocated in a plurality of encoded blocks BEi. Thereafter, the partial picture data DPi are orthogonally converted into pieces of converted picture data in the orthogonal converting section 16. Thereafter, the converted picture data are adaptively quantized and encoded in variable-length and run-length in the quantizing and variable-length encoding section 17. Therefore, as shown in FIG. 6(b), the converted picture data are compressed to produce pieces of compressed picture data DCi allocated in the compressed blocks BCi. In this case, each length of the compressed picture data DCi depends on contents of a piece of corresponding partial picture data DPi. Therefore, the lengths of the compressed picture data DCi differ from each other, and the compressed blocks BCi are not fixed to the same size. Thereafter, the compressed picture data DCi are transferred to the synchronizing-identifying-error correcting codes adding section 32.

In the adding section 32, as shown in FIG. 6(c), a group of compressed picture data DCi is divided into pieces of divided picture data DPi which are stored in the synchronizing blocks BS'i having the same synchronizing size. In cases where a head address AHj of a piece of compressed picture data DCj exists in a piece of divided picture data which is planned to be stored in a synchronizing block BS'k, a piece of synchronized picture data DS'k composed of the synchronizing signal SSk, the identifying code IDk, an existence information flag Fe for informing the existence of the head address AHj, the address pointer PAk, the block number NBk, the divided picture data DPk and the error correcting code ECk are stored in the synchronizing block BS'k.

In contrast, in cases where any head address does not exist in a piece of divided picture data which is planned to be stored in a synchronizing block BS'k, the divided picture data is composed of a rear part of a piece of compressed picture data DCj. In this case, unless a fore part of the compressed picture data DCj stored in a synchronizing block BS'k-1 is decoded, the rear part of the compressed picture data DCj cannot be decoded even though an address pointer PAk and a block number NBk are provided in the synchronizing block BS'k. Therefore, either an address pointer or a block number is not required in the synchronizing block BS'k. That is, a piece of synchronized picture data DS'k composed of the synchronizing signal SSk, the identifying code IDk, a no-existence information flag Fn for informing no existence of a head address, the divided picture data DDk and the error correcting code ECk are stored in the synchronizing block BS'k. Therefore, either an address pointer or a block number is not stored in the synchronizing block BS'k.

Figure 7:
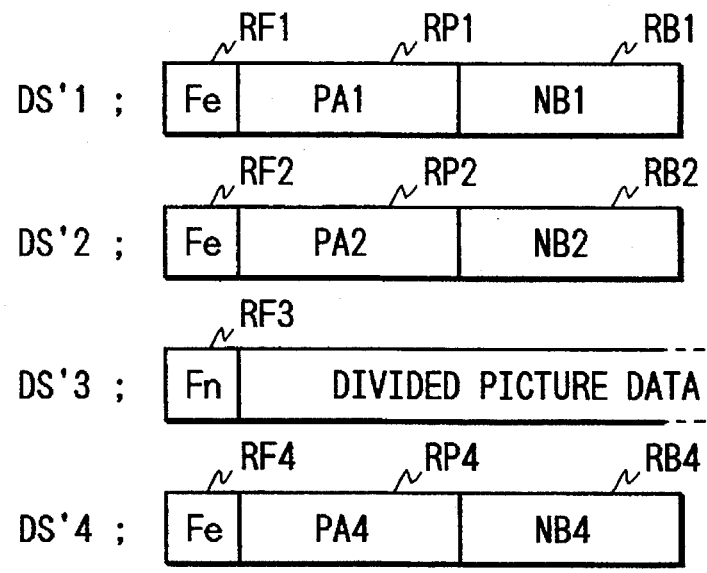
FIG. 7 shows informing flags, address pointers and block numbers allocated in informing flag regions, address pointer regions and block number regions of synchronizing blocks in which a top address of a piece of compressed picture data exist, and shows an informing flag and a rear part of compressed picture data of a synchronizing block in which any top address does not exist.

The existence information flag Fe is indicated by a piece of 1 bit information set in a high level condition, and the no-existence information flag Fn is indicated by a piece of 1 bit information set in a low level condition. The existence information flag Fe is placed at a position precedent to the address pointer PAj and the block number NBj, and the information flags Fe, Fn are respectively placed at a position subsequent to the identifying code IDj. For example, as shown in FIG. 7, the existence information flag Fe, the address pointer PA1 and the block number NB1 are stored in a flag region RF1, the address pointer region RP1 and the block number region RB1 of the synchronizing block BS'1 in that order. Also, the existence information flag Fe, the address pointer PA2 and the block number NB2 are stored in a flag region RF2, the address pointer region RP2 and the block number region RB2 of the synchronizing block BS'2 in that order. Also, the existence information flag Fe, the address pointer PA4 and the block number NB4 are stored in a flag region RF4, the address pointer region RP4 and the block number region RB4 of the synchronizing block BS'4 in that order. In contrast, because the no-existence information flag Fn is stored in a flag region RF3, either an address pointer region or a block number region is not allocated in the synchronizing block BS'4. Therefore, a piece of divided picture data obtained by equally dividing a group of compressed picture data DCi is stored subsequent to the no-existence information flag Fn.

Accordingly, in cases where any head address does not exist in a piece of divided picture data which is planed to be stored in a piece of synchronizing block BS'k, any address pointer and block number regions set in an empty condition are not formed in the synchronizing block BS'k. Therefore, a data length of the divided picture data DDk can be enlarged by an increased length equal to a total data length of both the address pointer and block number regions to set a size of the synchronizing block BS'k to the synchronizing size of the other synchronizing block BS'i in which a head address exist. As a result, a ratio of the compressed picture data DCi to pieces of control information composed of the synchronizing signals SSi, the identifying codes IDi, the address pointers PAi, the block numbers NBi and the error correcting codes ECi is increased, and a frame of picture data Dp can be compressed with a high efficiency.

Also, assuming that a synchronizing data length of a piece of divided picture data stored in a synchronizing block BS'k is set to an average value of compressed data lengths of the compressed picture data DCi, it is expected that a ratio of the number of synchronizing blocks in which any head address does not exist to the number of synchronizing blocks in which a head address exists reaches a prescribed value. In cases where the ratio is higher than a certain value which depends on sizes of an address pointer region RPk and a block number region RBk, an average amount of the transmission picture signal is increased according to the present invention, and a quality of the transmission picture signal can be enhanced.

The operation performed in the adding section 32 is described in detail with reference to FIG. 8.

Figure 8:
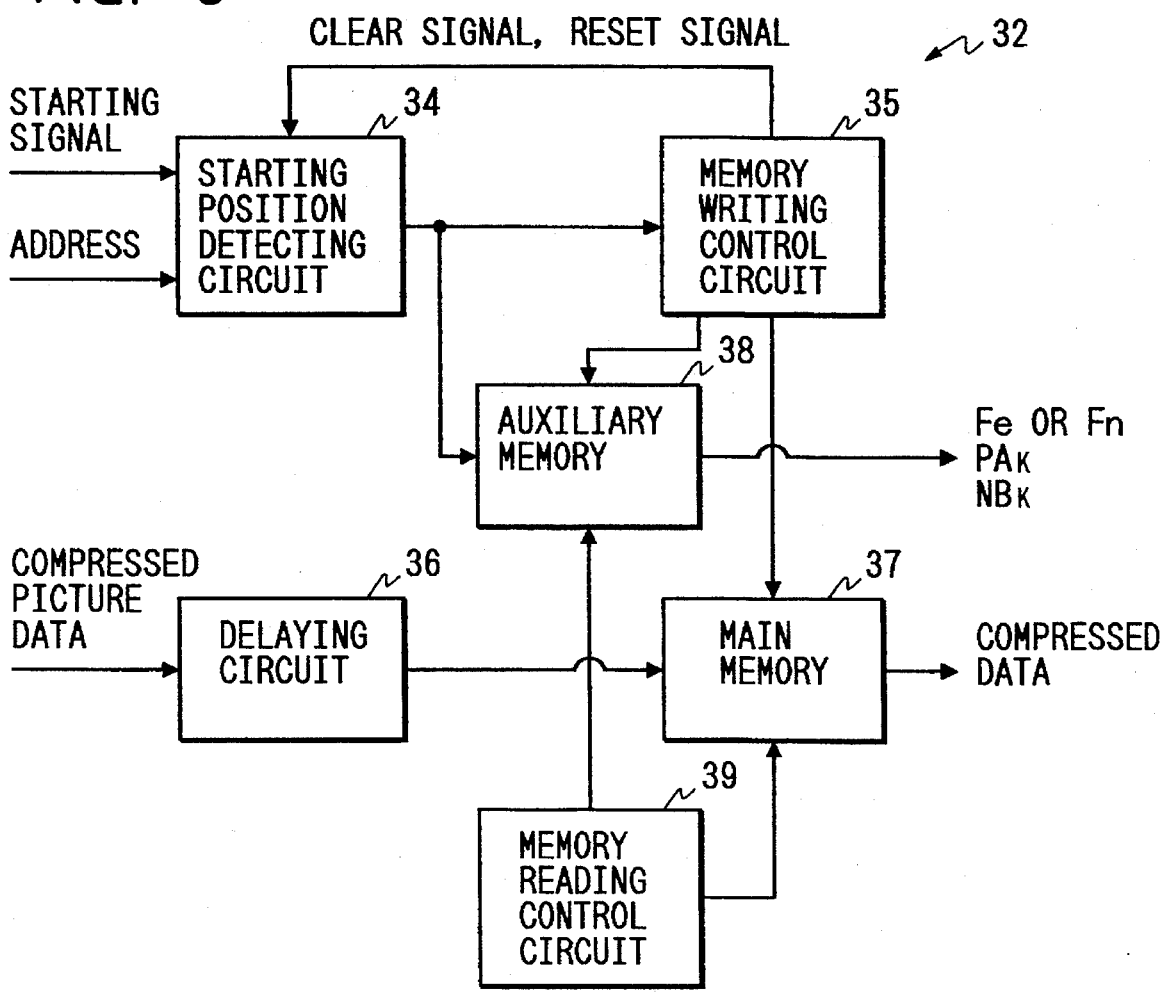
FIG. 8 shows a block diagram of a synchronizing-identifying-error correcting codes adding section shown in FIG. 5.

FIG. 8 shows a block diagram of the synchronizing-identifying-error correcting codes adding section 32.

A clear signal is transferred from a memory writing control circuit 35 to a starting position detecting circuit 34 to reset an internal count of the detecting circuit 34, and a counting operation is started to increment the internal count. Thereafter, a starting signal denoting a starting position of a variable-length encoding operation performed in the quantizing and variable-length encoding section 17 is transferred from the encoding section 17 to the starting position detecting circuit 34 each time a variable-length encoding operation is performed to encode a piece of partial picture data DPj to a piece of compressed picture data DCj. The starting position denotes a head address AHj of a piece of compressed picture data DCj from which the compressed picture data DCj encoded in the encoding section 17 Call be correctly decoded to the partial picture data DPj.

In cases where a first starting signal is transferred to the detecting circuit 34 when the internal count is equal to "N", a flag is set, and the internal count "N" and the head address AHj are held. In cases where a succeeding starting signal is not input to the detecting circuit 34 until the internal count reaches a bit number Nb=(the number of bits in the synchronizing block BS'k)—(the number of bits occupied by a region of an information flag Fe or Fn, a pointing address region RPk and a block number region RBk), the flag is reset. Also, the compressed picture data DCj produced in the encoding section 17 is delayed in a delaying circuit 36 until it is detected in the detecting circuit 34 whether or not a succeeding starting signal is input to the detecting circuit 34 before the internal count reaches the bit number Nb.

In cases where it is detected in the detecting circuit 34 that a succeeding starting signal is input to the detecting circuit 34 before the internal count reaches the bit number Nb, the flag set in the detecting circuit 34 is transferred to the control circuit 35, and a fore X bits of compressed picture data DCj delayed in the delaying circuit 36 is stored in a data area of a main memory 37 corresponding to the synchronizing block BS'k according to the flag of the control circuit 35. In addition, an existence information flag Fe, an address pointer PAk and a block number NBk produced in the detecting circuit 34 are written in a data area of an auxiliary memory 38 corresponding to the synchronizing block BS'k under the control of the control circuit 35.

Also, in cases where it is detected in the detecting circuit 34 that a succeeding starting signal is not input to the detecting circuit 34 before the internal count reaches the bit number Nb, the flag reset in the detecting circuit 34 is transferred to the control circuit SS, and a particular bit length of compressed picture data DCj delayed in the delaying circuit 36 is stored in a data area of the main memory 37 corresponding to a synchronizing block BS'k according to the flag of the control circuit 35. The particular bit length corresponds to a bit number Nbb=(the number of bits in the synchronizing block BS'k)—(the number of bits occupied by a region of an information flag Fn). In addition, a no-existence information flag Fn produced in the detecting circuit 34 is written in a data area of the auxiliary memory 88 corresponding to the synchronizing block BS'k under the control of the control circuit 35.

Figure 9A:
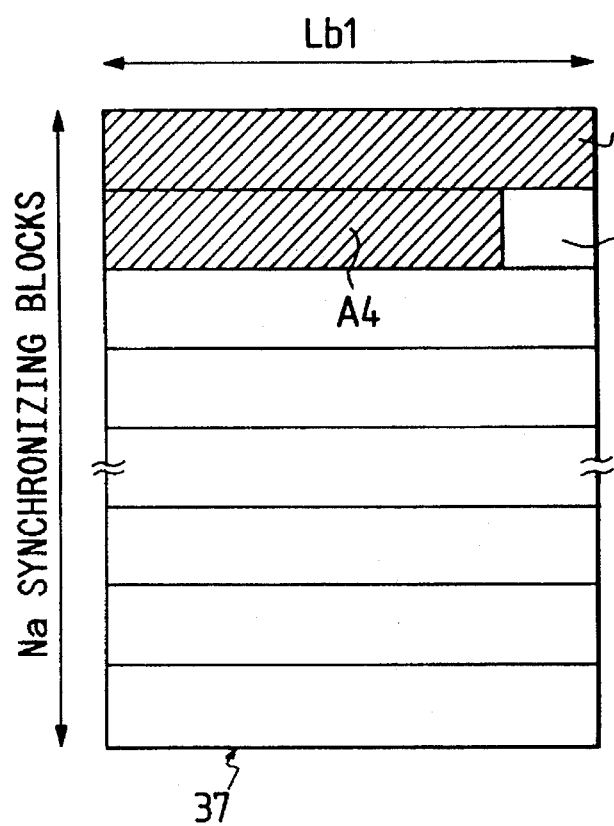
FIG. 9(a) shows a plurality of data areas of a main memory shown in FIG. 8.
Figure 9B:
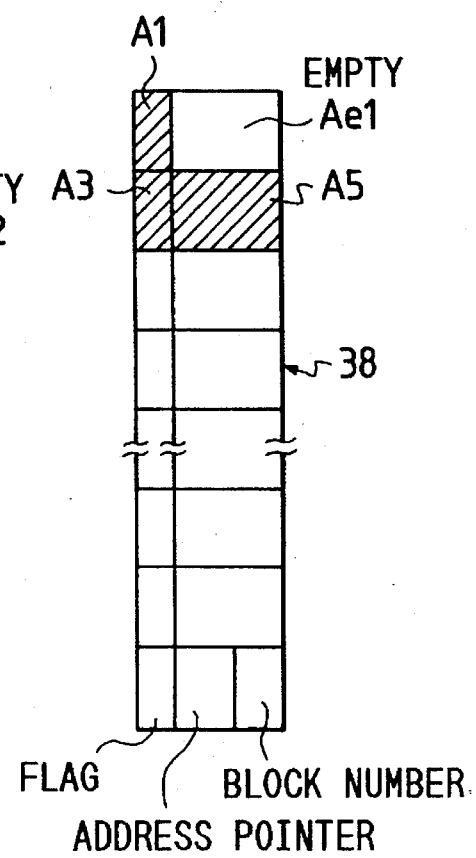
FIG. 9(b) shows a plurality of data areas of an auxiliary memory shown in FIG. 8.

FIG. 9(a) shows a plurality of data areas of the main memory 37, and FIG. 9(b) shows a plurality of data areas of the auxiliary memory 38.

As shown in FIG. 9(a), the main memory 37 is composed of a plurality of layers of data areas which each has a data area width equivalent to a bit length Lbl=(a bit length of a synchronizing block BS'k)—(a bit length of an information flag Fe or Fn). Each layer corresponds to a synchronizing block BS'k, and the number Na of data areas existing in the main memory 37 is set in dependence on a regular time required to read out the compressed picture data DCi from the main memory 37. Also, as shown in FIG. 9(b), the auxiliary memory 38 is composed of a plurality of layers of data areas which each has a data area width equivalent to a total bit length of an information flag Fe or Fn, an address pointer PAk and a block number NBk. The number of data areas existing in the auxiliary memory 38 is set to the number Na.

In cases where a no-existence information flag Fn is written in an area A1 of the auxiliary memory 38 corresponding to a synchronizing block BS'k, one or more pieces of compressed picture data DCi corresponding to the synchronizing block BS'k are stored in the entire data area A2 of the main memory 37 corresponding to the synchronizing block BS'k. In this case, a partial area Ae1 of the auxiliary memory 38 prepared for an address pointer and a block number is empty. In contrast, in cases where an existence information flag Fe is written in an area A3 of the auxiliary memory 38 corresponding to a synchronizing block BS'k, one or more pieces of compressed picture data DCi corresponding to the synchronizing block BS'k are stored in a partial data area A4 of the main memory 37 corresponding to the synchronizing block BS'k. In this case, an address pointer PAk and a block number NBk are written in an area A5 of the auxiliary memory 38 corresponding to the synchronizing block BS'k, and a bit length of the compressed picture data DCi is equal to a length Lb2=(a bit length of the synchronizing block BS'k)—(a total bit length of an information flag Fe or Fn, a pointing address PAk and a block number BNk). Therefore, an empty area Ae2 is generated in the main memory 37 corresponding to the synchronizing block BS'k.

Accordingly, a total bit length of the areas A1, A2 can be equal to that of the areas A3, A4 and A5.

Thereafter, each time a writing operation to the main memory 37 for one of the synchronizing blocks BS'i is started, a reset signal produced in the control circuit 35 is transferred to the detecting circuit 34 to reset the internal count. Thereafter, the information flag Fe or Fn written in the auxiliary memory 38 is first read out under the control of a memory reading circuit 39. In cases where an existence information flag Fe is read out, the address pointer PAk and the block number NBk written in the auxiliary memory 38 are secondly read out under the control of the memory reading circuit 39. Also, the compressed picture data DCj stored in the main memory 37 is read out under the control of the memory reading circuit 39. In cases where a no-existence information flag Fn is read out, the compressed picture data DCj stored in the main memory 37 is read out under the control of the memory reading circuit 39. This reading operation is continued until one or more information flags Fe, Fn, the address pointers PAi and the block numbers NBi written in the synchronizing block BS'k of the auxiliary memory 38 and the compressed picture data DCi stored in the synchronizing block BS'k of the main memory 37 are read out. Thereafter, a synchronizing signal SSk, an identifying code IDk and an error correcting code ECk are added to form a piece of synchronized picture data DS'k.

The above mentioned procedure is repeated to form each of the synchronized picture data DS'i.

Thereafter, returning to FIG. 5, the synchronized picture data DS'i are recorded in the recording medium 19 through the transmission path 13. In cases where the synchronized picture data DS'i are reproduced from the recording medium 19, the synchronized picture data DS'i recorded are transmitted to the synchronizing-identifying codes separating and error correcting section 33 through the transmission path 13. In this case, a transmission error occurs in the compressed picture data DCi of the synchronized picture data DS'i at a prescribed probability. Therefore, the transmission error is deleted in the section 88. In detail, the synchronizing blocks BS'i are recognized according to the synchronizing signal SSi and the identifying code IDi. Thereafter, a type of an information flag stored at the information flag region RFk of the synchronizing block BS'k is checked.

In cases where the existence information flag Fe is stored, the existence of the address pointer PAk and the block number NBk is recognized. Therefore, the compressed picture data DCi included in the synchronizing picture data DS'k are recognized according to the address pointer PAk and the block number NBk. Thereafter, an error correction is performed to delete the transmission error occurring in the compressed picture data DCi of the synchronizing picture data DS'k according to the error correcting code ECk. Thereafter, the synchronizing signal SSk, the identifying code IDk, the existence information flag Fe, the address pointer PAk, the block number NBk and the error correcting code ECk are separated from the synchronized picture data DS'k to correctly reproduce the compressed picture data DCi of the synchronizing picture data DS'k.

In contrast, in cases where the no-existence information flag Fn is stored, no-existence of an address pointer or a block number NBk is recognized. Therefore, a rear part of compressed picture data DCj included in the synchronizing picture data DS'k is quickly recognized without any address number or block number according to the no-existence information flag Fn. Thereafter, an error correction is performed to delete the transmission error occurring in the rear part of compressed picture data DCj of the synchronizing picture data DS'k according to the error correcting code ECk. Thereafter, the synchronizing signal SSk, the identifying code IDk, the no-existence information flag Fn and the error correcting code ECk are separated from the synchronized picture data Dg'k to correctly reproduce the rear part of compressed picture data DCj of the synchronizing picture data DS'k.

Thereafter, the compressed picture data DCi are transferred to the variable-length decoding and inverse quantizing section 33 in sequence. Ill the section 33, the compressed picture data DCi coded in the variable-length are decoded and inversely quantized to reproduce the converted picture data in sequence. For example, the rear part of compressed picture data DCj is decoded after a fore part of compressed picture data DCj is decoded. Thereafter, the converted picture data reproduced are transferred to the inverse orthogonal converting section 22 and are inversely converted according to an inverse orthogonal conversion to reproduce the partial picture data DPi. Thereafter, the partial picture data DPi reproduced are transferred to the signal synthesizing section 23, and the digital picture signal designating the picture data Dp are reproduced by synthesizing the partial picture data DPi in order of the block number and are output.

Accordingly, because a rear part of compressed picture data DCj included in the synchronizing block BS'k is quickly recognized without any address number or block number according to the no-existence information flag Fn, the reproduction of the picture signal can be quickly performed.

Figure 1:
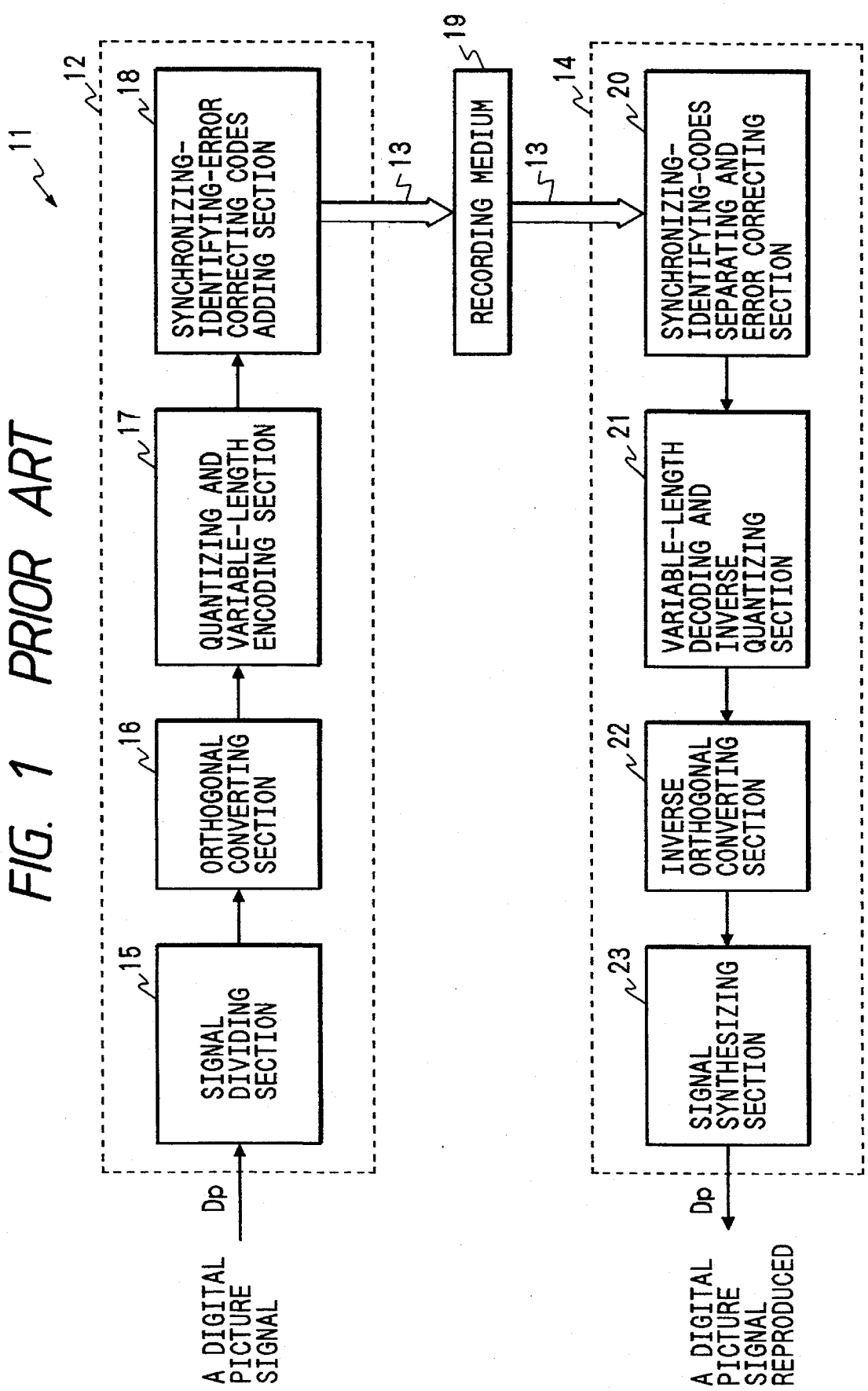
FIG. 1 is a block diagram of a conventional digital data transmission apparatus.
Figure 3:
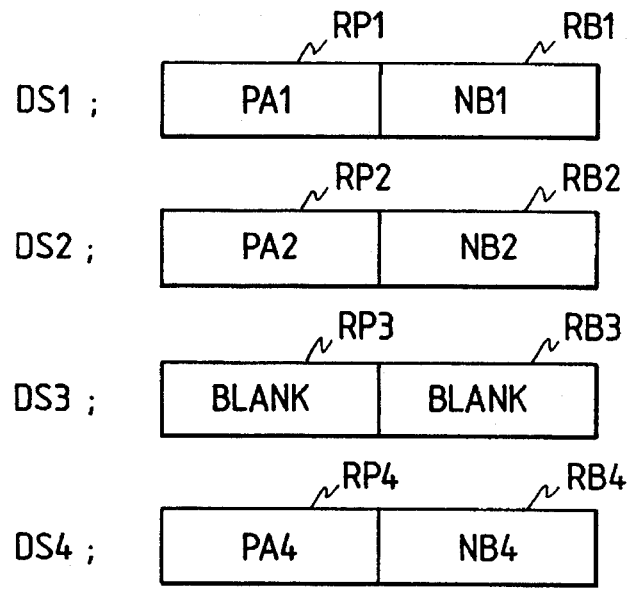
FIG. 3 shows address pointers and block numbers allocated in address pointer regions and block number regions of synchronizing blocks.
Figure 4A:
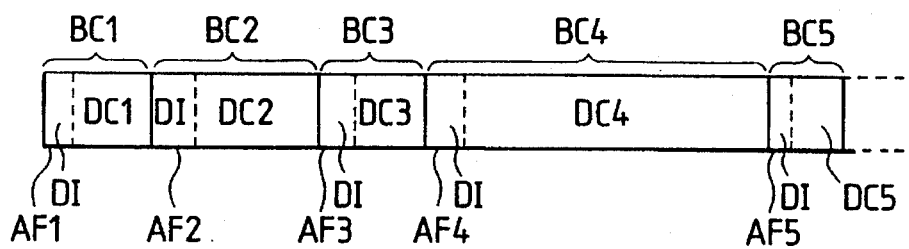
FIG. 4A shows front areas in compressed blocks.
Figure 4B:
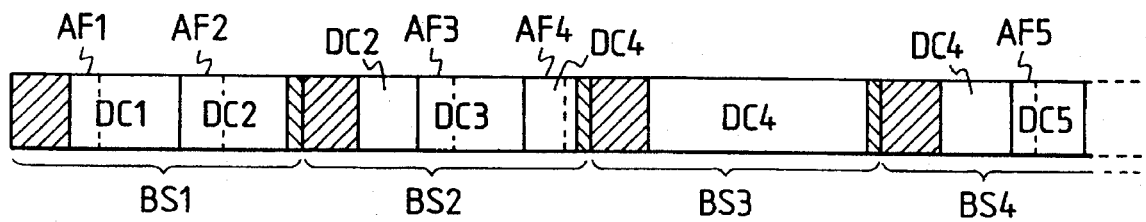
FIG. 4B shows the front areas in synchronizing blocks.

In the first embodiment, even though a plurality of head addresses AHi of the compressed picture data DCi exist in a synchronizing block BS'k, the existence information flag Fe is merely placed after the identifying code IDk. However, as shown in FIG. 4, it is applicable that a compressed data number code NCk for indicating the number of compressed picture data DCi existing in a synchronizing block BS'k be added subsequently to the existence information flag Fe. In this case, pieces of compressed picture data DCi can be reliably distinguished from each other so that all of the compressed picture data DCi can be reproduced with a high accuracy.

Also, the information flag region RFk, the address pointer region RPk and the block number region RBk are arranged in that order in the synchronized block BS'k. However, the order of the regions RFk, RPk and RBk can be changed if necessary.

Also, the recording medium 19 such as a magnetic tape, an optical disk and the like is applicable.

Next, a digital data transmission method and apparatus in which the second drawback is solved is described according to a second embodiment of the present invention.

Figure 10:
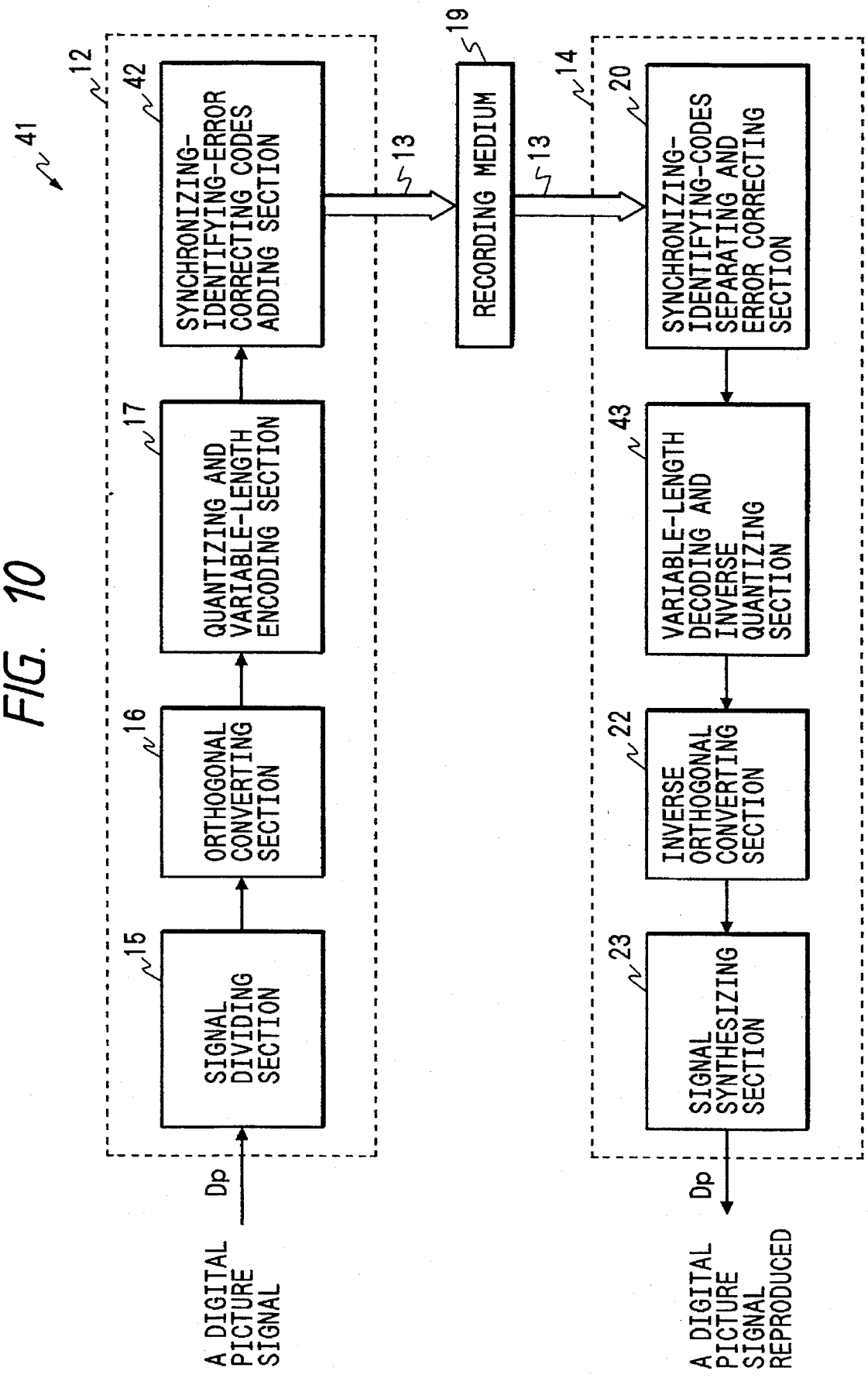
FIG. 10 is a block diagram of a digital data transmission apparatus according to a second embodiment of the present invention.

FIG. 10 is a block diagram of a digital data transmission apparatus according to a second embodiment of the present invention.

As shown in FIG. 10, a digital data transmission apparatus 41 comprises the signal dividing section 15, the orthogonal converting section 16, the quantizing and variable-length encoding section 17, a synchronizing-identifying-error correcting codes adding section 42, the transmission path 13, a synchronizing-identifying-codes separating and error correcting section 20, a variable-length decoding and inverse quantizing section 43, the inverse orthogonal converting section 22, and the signal synthesizing section 23.

In the above configuration, a digital picture signal designating a frame of picture data Dp is input to the signal dividing section 15, and the digital picture signal is divided into pieces of partial picture data DPi (i=1,2, - - - ) allocated in the encoded blocks BEi. Thereafter, the partial picture data DPi are orthogonally converted into pieces of converted picture data in the orthogonal converting section 16. Thereafter, the converted picture data are adaptively quantized and encoded in variable-length and run-length in the quantizing and variable-length encoding section 17. Therefore, the converted picture data are compressed to produce pieces of compressed picture data DCi allocated in the compressed blocks BCi.

Figure 11A:
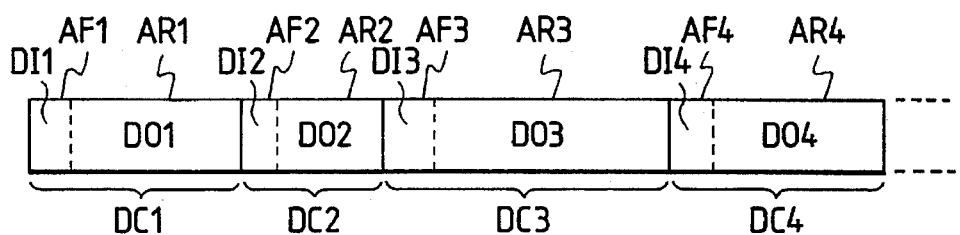
FIG. 11A partially shows a series of compressed picture data DCi allocated in the compressed blocks BCi in which pieces of important compressed data DIi are placed in front areas AFi of the compressed blocks BCi.

FIG. 11A shows a series of compressed picture data DCi allocated in the compressed blocks BCi in which pieces of important compressed data DIi are placed in front areas AFi of the compressed blocks BCi.

As shown in FIG. 11A, pieces of important compressed data DIi are placed in front areas AFi of the compressed blocks BCi, and pieces of ordinary compressed data DOi are placed in rear areas ARi of the compressed blocks BCi. In cases where a discrete cosine transformation is performed in the orthogonal converting section 16, each of the important compressed data DIi is composed of converting coefficients for lower frequency components such as a discrete cosine coefficient, a first-order coefficient and a second-order coefficient. Also, in cases where a sub-band division is performed in the orthogonal converting section 16, each of the important compressed data DIi is composed of low frequency components of the compressed picture data DCi.

Thereafter, the compressed picture data DCi are transferred to the synchronizing-identifying-error correcting codes adding section 42. In the adding section 42, a group of compressed picture data DCi is divided into pieces of rearranged picture data DRi which are stored in the synchronizing blocks BS'i having the same synchronizing size. In detail, in cases where a head address AHj of a piece of compressed picture data DCj exists in a piece of rearranged picture data DRk planned to be stored in a synchronizing block BS'k, a piece of synchronized picture data DS'k composed of the synchronizing signal SSk, the identifying code IDk, an existence information flag Fe for informing the existence of the head address AHj, an address pointer PAk, a block number NBk, the rearranged picture data DRk and the error correcting code ECk are stored in the synchronizing block BS'k in that order.

Figure 11B:
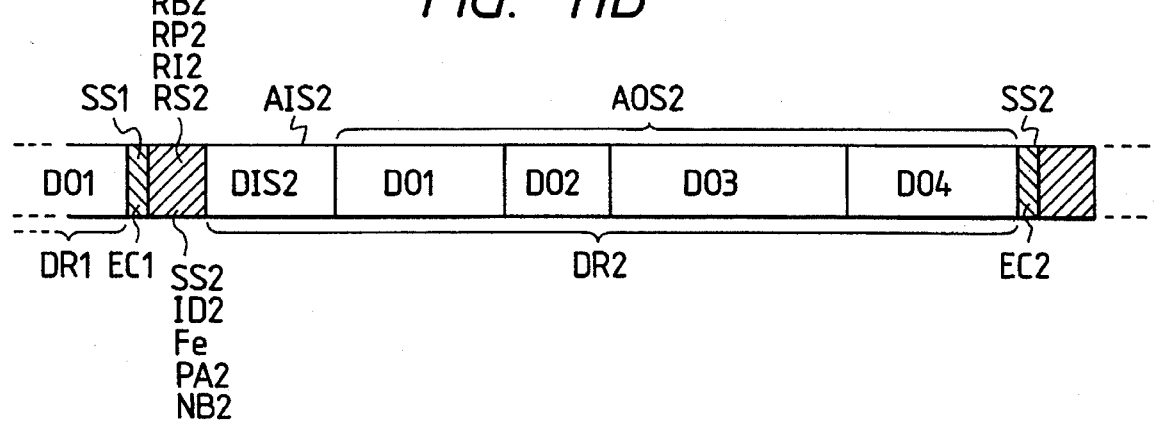
FIG. 11B partially shows a series of synchronized picture data DS'i allocated in the synchronized blocks BCi in which pieces of important synchronized data DISi and pieces of ordinary compressed data DOi are separatedly arranged.
Figure 11C:
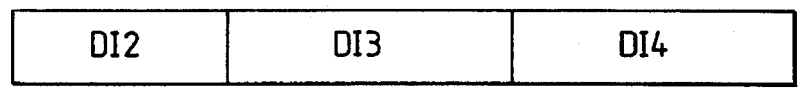
FIG. 11C shows pieces of important compressed data DIi included in a piece of important synchronized data AISk on an enlarged scale.

In addition, as shown in FIG. 11B, each of the rearranged picture data DRi following the existence information flags Fe is composed of a piece of important synchronized data DISk allocated in an important synchronizing area AISk of the synchronizing block BS'k and one or more pieces of ordinary compressed data DOi allocated in an ordinary synchronizing area AOSk of the synchronizing block BS'k. The existence of a head address of the important synchronized data DISk is informed by the existence information flag Fe, the head address of the important synchronized data DISk is pointed by the address pointer PAk, and a position of the important synchronized data DISk is indicated by the block number NBk. For example, in cases where a piece of rearranged picture data DR2 stored in a synchronizing block BS'2 is composed of a rear part of compressed picture data DC1, the compressed picture data DC2, DC3 and a fore part of compressed picture data DC4, as shown in FIG. 11C, a piece of important synchronized data DIS2 is formed of pieces of important compressed data DI2, DI3 and DI4, and the ordinary compressed data DOi of the rearranged picture data DR2 are formed of a rear part of ordinary compressed data DO1, pieces of ordinary compressed data DO2 and DO3 and a fore part of ordinary compressed data DO4. In this case, a piece of important compressed data DI1 and a fore part of ordinary compressed data DO1 (not shown) are stored in a synchronizing block BS'i.

In contrast, in cases where any head address does not exist in a piece of rearranged picture data DRk which is planed to be stored in a synchronizing block BS'k, the rearranged picture data is composed of a rear part of a piece of compressed picture data DCj, and a piece of synchronized picture data DS'k composed of the synchronizing signal SSk, the identifying code IDk, the no-existence information flag Fn for informing no existence of a head address, the rearranged picture data DRk and the error correcting code ECk are stored in the synchronizing block BS'k.

Figure 11D:
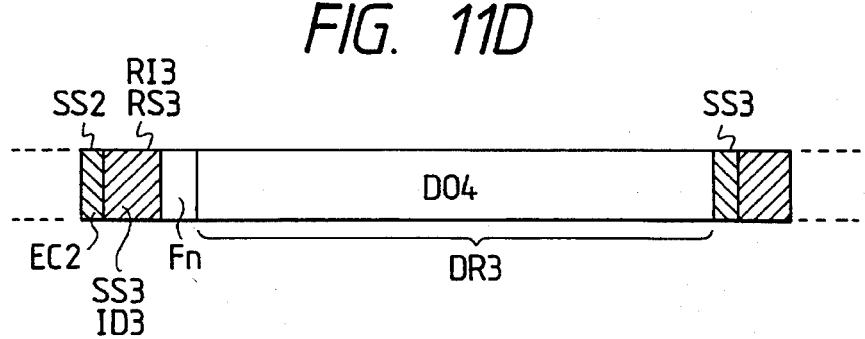
FIG. 11D partially shows a synchronized picture data DS'k allocated in the synchronized block BCk in which a rear part of ordinary compressed data DOk is arranged.

In addition, as shown in FIG. 11D, each of the rearranged picture data DRi following the no-existence information flags Fn is composed of a piece of ordinary compressed data DOj allocated in an ordinary synchronizing area AOSk of the synchronizing block BS'k. For example, in cases where a piece of rearranged picture data DR3 stored in a synchronizing block BS'3 is formed of a rear part of compressed picture data DC4, the rearranged picture data DR3 is a rear part of ordinary compressed data DO4. In this case, a piece of important compressed data DI4 of the compressed picture data DC4 is stored in the synchronizing block BS'2.

The operation performed in the adding section 42 is described in detail with reference to FIG. 12.

Figure 12:
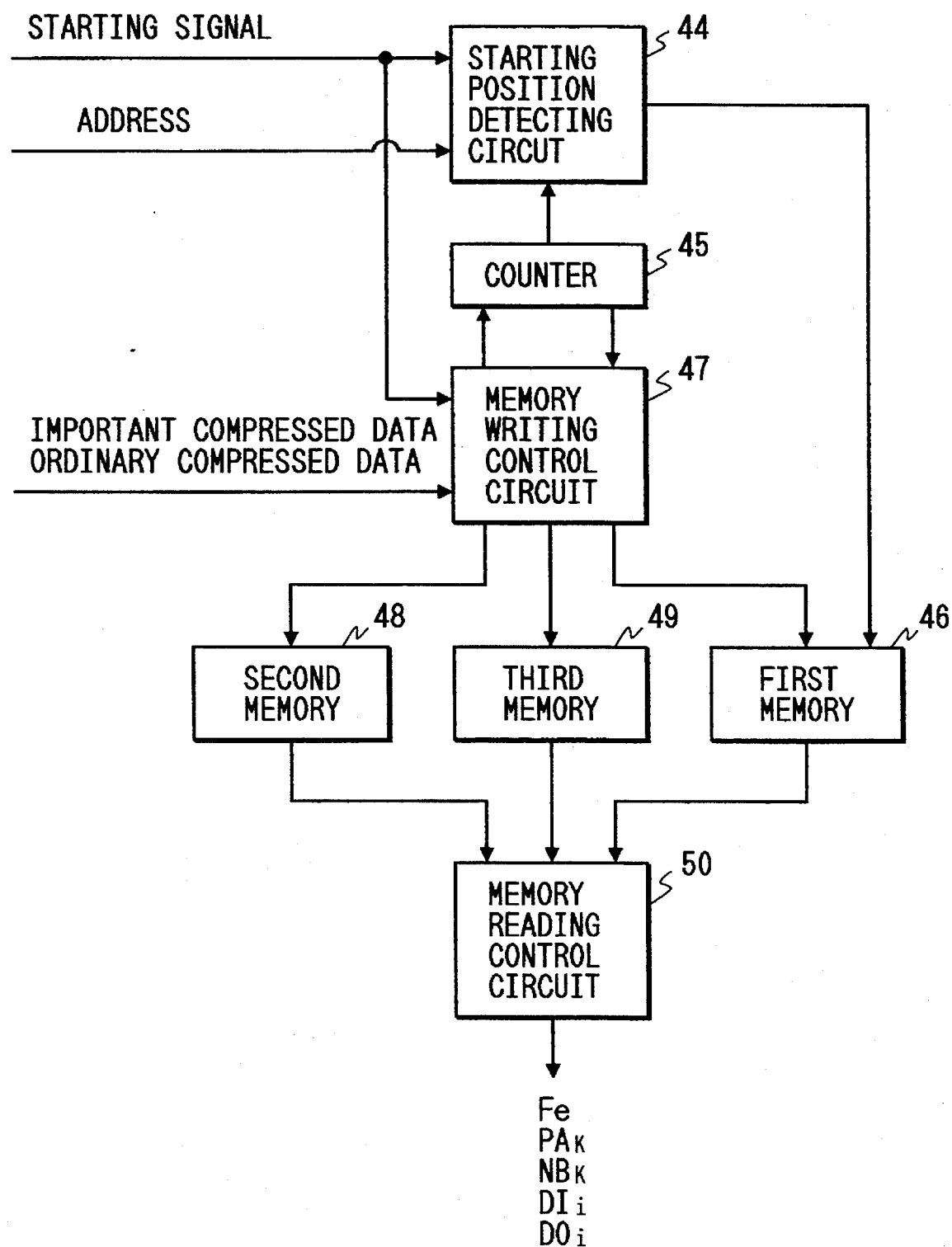
FIG. 12 shows a block diagram of a synchronizing-identifying-error correcting codes adding section shown in FIG. 10.

FIG. 12 shows a block diagram of the synchronizing-identifying-error correcting codes adding section 42.

A count value is incremented in a counter 45. Also, a starting signal denoting a starting position of a variable-length encoding operation performed in the quantizing and variable-length encoding section 17 is transferred from the encoding section 17 to the starting position detecting circuit 44 each time a variable-length encoding operation is performed to encode a piece of partial picture data DPj to a piece of compressed picture data DCj. The starting position denotes a head address AHj of a piece of compressed picture data DCj from which the compressed picture data DCj encoded in the encoding section 17 can be correctly decoded to the partial picture data DPj.

When the count value produced in the counter 45 is transferred to the starting position detecting circuit 44, the count value is stored as an address pointer PAk in a data area of a first memory 46 corresponding to a synchronizing block BS'k in synchronization with the starting signal. Also, an existence information flag Fe produced in the detecting circuit 44 is stored in the data area of the first memory 46 to indicate that a head address AHj utilized to correctly decode a piece of compressed picture data DCj exists in the synchronizing block BS'k. In cases where a plurality of head addresses AHi of pieces of compressed picture data DCi exist in the synchronizing block BS'k, a head address AHj of a piece of compressed picture data DCj placed at a top position among the compressed picture data DCi is stored in the data area of the first memory 46. In addition, a block number NBk produced in the detecting circuit 44 is stored in the data area of the first memory 46 to indicate where the compressed picture data DCj is placed in the synchronizing block BS'k.

Also, a starting signal is transferred from the encoding section 17 to a memory writing control circuit 47 each time a variable-length encoding operation is performed to encode a piece of partial picture data DPj to a piece of compressed picture data DCj. Also, each time a starting signal is transferred to the memory writing control circuit 47, a fixed length of important compressed data DIj produced in the quantizing and variable-length encoding section 17 is stored in a data area of a second memory 48 corresponding to the synchronizing block BS'k through the control circuit 47 on condition that the count value of the counter 45 is lower than a bit number Nb=(the number of bits in the synchronizing block BS'k)—(the number of bits in the important compressed data DIk). In addition, the number of starting signals detected in the detecting circuit 44 is held in the control circuit 47, and the number of starting signals is written in the first memory 46. The number of starting signals denotes the number of pieces of important compressed data DIi corresponding to the synchronized block BS'k. After a series of important compressed data DIi are stored in the data area of the second memory 48 corresponding to the synchronizing block BS'k, pieces of ordinary compressed data DOi subsequent to the important compressed data DIi are stored in series in a data area of a third memory 49 corresponding to the synchronizing block BS'k.

The count value of the counter 45 is counted up each time the important compressed data DIk or the ordinary compressed data DOk is stored in the second or third memory 48 or 49, and the count value is reset to an initial value "0" after the count value reaches a maximum value Vm=(the number of bits in the synchronizing block BS'k)—(the number of bits in a header composed of the existence information flag Fe, the address pointer PAk and the block number NBk).

Thereafter, a data area of the first memory 46 corresponding to a synchronizing block BS'k is referred by a memory reading control circuit 50. In cases where an existence information flag Fe is set in the data area of the first memory 46 corresponding to the synchronizing block BS'k, an address pointer PAk subsequent to the flag Fe is read out to the control circuit 50. At the same time, an offset value corresponding to the number of pieces of important compressed data DIi included in the synchronizing block BS'k is output from the detecting circuit 44 to the control circuit 50 through the first memory 46. In the control circuit 50, the offset value and a value of the address pointer PAk stored in the first memory 46 are added to each other to produce a new address pointer. Thereafter, the number of important compressed data DIi corresponding to the synchronized block BS'k, the important compressed data DIi, the ordinary compressed data DOi corresponding to the synchronized block BS'k are output from the first memory 46 to the control circuit 50 in that order. Thereafter, a synchronizing signal SSk, an identifying code IDk and an error correcting code ECk are added to form a piece of synchronized picture data DS'k.

The above mentioned procedure is repeated to form each of the synchronized picture data DS'i.

Thereafter, returning to FIG. 10, the synchronized picture data DS'i are recorded in the recording medium 19 through the transmission path 13. In cases where the synchronized picture data DS'i recorded are reproduced from the recording medium 19, transmission errors occur in the compressed picture data DCi of the synchronized picture data DS'i at various probabilities. In this case, a probability of the occurrence of a transmission error in the important synchronized data DISi allocated in the important synchronizing areas AISi of the synchronizing blocks BS'i is lower than that in the ordinary Compressed data DOi allocated in the ordinary synchronizing areas AOSi of the synchronizing blocks BS'i because the important synchronized data DISi are arranged near to pieces of control signals like the synchronized signals SSi and the identifying codes IDi. Therefore, the important synchronized data DISi can be correctly reproduced from the recording medium 19 at a higher probability than that in the ordinary compressed data DOi.

The transmission errors undesirably occurring in the compressed picture data DCi of the synchronized picture data DS'i are deleted in the synchronizing-identifying codes separating and error correcting section 43. In detail, the synchronizing blocks BS'i are recognized according to the synchronizing signal SSi and the identifying code IDi. Thereafter, a type of an information flag stored at the information flag region RFk of the synchronizing block BS'k is checked.

In cases where the existence information flag Fe is stored, the existence of the important synchronized data DISk is recognized. Thereafter, a head address of the important synchronized data DISk is recognized according to the address pointer PAk, and a position of the important synchronized data DISk is recognized according to the block number NBk. Thereafter, the ordinary compressed data DOi subsequent to the important synchronized data DISk is recognized. Thereafter, an error correction is performed to delete the transmission errors occurring in the important compressed data DIi of the important synchronized data DISk and the ordinary compressed data DOi according to the error correcting code ECk. Thereafter, the synchronizing signal SSk, the identifying code IDk, the existence information flag Fe, the address pointer PAk, the block number NBk and the error correcting code ECk are separated from the rearranged picture data DRk to correctly reproduce the compressed picture data DCi.

In contrast, in cases where the no-existence information flag Fn is stored, it is recognized that any important synchronized data DISk does not exist. Therefore, the ordinary compressed data DOk is quickly recognized without any address number or block number according to the no-existence information flag Fn. Thereafter, an error correction is performed to delete the transmission error occurring in the ordinary compressed data DOk according to the error correcting code ECk. Thereafter, the synchronizing signal SSk, the identifying code IDk, the no-existence information flag Fn and the error correcting code ECk are separated from the rearranged picture data DRk to correctly reproduce the compressed picture data DCj equivalent to the ordinary compressed data DOk.

Thereafter, the compressed picture data DCi correctly reproduced are decoded and inversely quantized to sequentially reproduce the converted picture data in the variable-length decoding and inverse quantizing section 21. Thereafter, the converted picture data reproduced are inversely converted according to an inverse orthogonal conversion to reproduce the partial picture data DPi in the inverse orthogonal converting section 22. Thereafter, the digital picture signal designating the picture data Dp is reproduced by synthesizing the partial picture data DPi in order of the block number in the signal synthesizing section 23, and the digital picture signal designating the picture data Dp are output.

Accordingly, because the important synchronized data DISi formed of the important compressed data DIi are arranged near to the synchronized signals SSi and the identifying codes IDi in the synchronizing-identifying-error correcting codes adding section 42, a probability of the occurrence of a transmission error in the important compressed data DIi can be lowered as compared with that in the ordinary compressed data DOi. Therefore, the digital picture signal designating the picture data Dp can be reproduced at a high quality.

Also, in cases where a special reproduction such as a high speed search is performed in the digital data transmission apparatus 41, all of the compressed picture data DCi in each of the synchronizing block BS'i are not necessarily reproduced. However, even though all of the compressed picture data DCi in each of the synchronizing block BS'i are not reproduced, the important compressed data DIi of the synchronizing block BS'i are selectively reproduced. Therefore, an viewer can recognize the digital picture signal designating the picture data Dp even though a quality of the digital picture signal is inferior in the special reproduction.

Also, even though all of the compressed picture data DCi in each of the synchronizing block BS'i are not reproduced in a normal reproduction because of a reproduction error, the important compressed data DIi of the synchronizing block BS'i are reliably reproduced because the important compressed data DIi are placed near to the synchronizing signals SSi and the identifying codes IDi. Therefore, an viewer can recognize the digital picture signal designating the picture data Dp even though a quality of the digital picture signal is inferior in the normal reproduction.

In the second embodiment, the information flag Fe or Fn is added just before each of the important compressed data DIi to operate the digital data transmission apparatus 41 in the same manner as the apparatus 31 in the first embodiment. However, the information flags Fe, Fn are not necessarily required.

Figure 13:
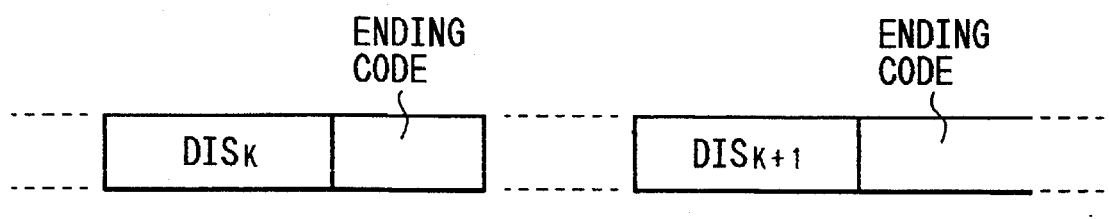
FIG. 13 shows a synchronizing block BS'k according to a first modification of the second embodiment.

Also, as shown in FIG. 13, it is applicable that ending codes for indicating ends of the important synchronizing areas AISi of the synchronizing blocks BS'i be added at the ends of the important synchronizing areas AISi. In this case, even though pieces of important compressed data DIi are included in an important synchronizing area AISk, all of the important compressed data DIi can be reliably distinguished from each other so that all of the important compressed data DIi can be reproduced with a high accuracy.

Figure 14:
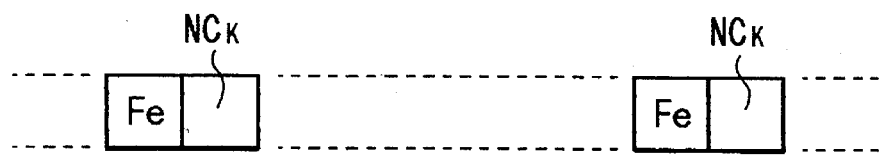
FIG. 14 shows a synchronizing block BS'k according to a second modification of the second embodiment.

Also, even though a plurality of head addresses AHi of the compressed picture data DCi exist in a synchronizing block BS'k, the existence information flag Fe is merely placed after the identifying code IDk in the second embodiment. However, as shown in FIG. 14, it is applicable that a compressed data number code NCk for indicating the number of compressed picture data DCi existing in a synchronizing block BS'k be added subsequently to the existence information flag Fe. In this case, pieces of important compressed data DIi of the compressed picture data DCi can be reliably distinguished from each other so that all of the important compressed data DIi can be reproduced with a high accuracy.

Figure 15:
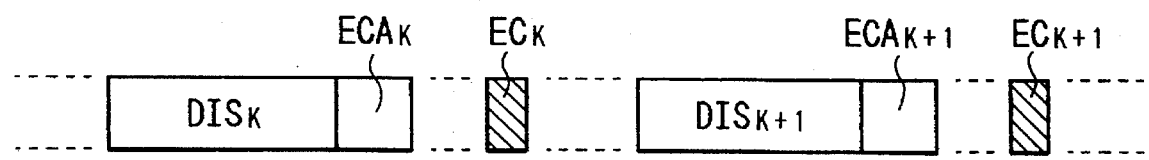
FIG. 15 shows a synchronizing block BS'k according to a third modification of the second embodiment.

Also, the error correcting codes ECi placed in the synchronizing blocks BS'i are utilized to delete the transmission errors undesirably occurring in the compressed picture data DCi of the synchronized picture data DS'i. However, as shown in FIG. 15, it is applicable that additional error correcting codes ECAi for deleting transmission errors undesirably occurring in the important synchronized data DISi be added just after the important synchronized data DISi.

Also, converting coefficients for lower frequency components such as a DC coefficient, a first-order coefficient and a second-order coefficient are regarded as each of the important compressed data DIi in cases where the discrete cosine transformation is performed in the orthogonal converting section 16. Therefore, the converting coefficients included in the compressed picture data DCj are moved to the front area AFj of the compressed block BCj. However, each of the important compressed data DIi is not limited to the converting coefficients. For example, it is applicable that a piece of fixed bit data placed in an area of fixed bits in the compressed block BCj be regarded as each of the important compressed data DIi. In this case, because the area of the fixed bits is placed in a front portion of the compressed block BCj, it is easy to recognize the range of the front portion as that of the front area AFj.

Also, the recording medium 19 such as a magnetic tape, an optical disk and the like is applicable.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A digital data transmission method, comprising the steps of:

coding pieces of partial information data having the same data length to produce pieces of compressed information data having different data lengths;

allocating the pieces of compressed information data in a plurality of synchronizing blocks having the same synchronizing data length in coding order of the compressed information data to produce a piece of synchronized information data for each of the synchronizing blocks, the pieces of synchronized information data having the same data lengths, and each piece of synchronized information data being composed of one or more pieces of compressed information data or a rear part of a piece of compressed information data;

judging whether or not a particular piece of compressed information data having a head address exists in each of the pieces of synchronized information data;

storing a piece of existence information indicating the existence of the particular piece of compressed information data in each of one or more first particular synchronizing blocks in which the particular piece of compressed information data having the head address exists;

storing both a piece of address pointing information indicating a particular position of the head address of the particular piece of compressed information data and a piece of positional information indicating a data position of the particular piece of compressed information data in each of the first particular synchronizing blocks;

storing a piece of no-existence information indicating no-existence of the particular piece of compressed information data in each of one or more second particular synchronizing blocks in which the particular piece of compressed information data having the head address does not exist; and transmitting first particular pieces of synchronized information data which each are composed of the existence information, the address pointing information, the positional information, the particular piece of compressed information data and one or more other pieces of compressed information data subsequent to the particular compressed information data in the first particular synchronizing block and second particular pieces of synchronized information data which each are composed of the no-existence information and a rear part of a piece of compressed information data in the second particular synchronizing block.

2. A digital data transmission method according to claim 1, additionally including:

storing a compressed data number code for indicating the number of compressed information data in each of the synchronizing blocks in which the particular piece of compressed information data having the head address exists.

3. A digital data transmission method according to claim 1, additionally including:

reproducing pieces of synchronized information data of each first particular synchronizing block in which the existence information, the address pointing information, the positional information, the particular piece of compressed information data and one or more other pieces of compressed information data exist;

recognizing the existence of the particular piece of compressed information data of each first particular synchronizing block according to the existence information of each first particular synchronizing block;

recognizing the data position of the particular piece of compressed information data of each first particular synchronizing block according to the positional information of each first particular synchronizing block;

recognizing the particular position of the head address of the particular piece of compressed information data in the first particular pieces of synchronized information data according to the address pointing information; and decoding the particular piece of compressed information data and the other pieces of compressed information data of the first particular pieces of synchronized information data from the head address of the particular piece of compressed information data.

4. A digital data transmission method according to claim 1, additionally including:

reproducing the second particular pieces of synchronized information data in which the no-existence information and a rear part of the compressed information data are included;

recognizing the existence of the rear part of the compressed information data in each of the second particular pieces of synchronized information data according to the no-existence information; and decoding the rear part of the compressed information data in each of the second particular pieces of synchronized information data after a head part of the compressed information data of a preceding piece of synchronized information data transmitted previous to each of the second particular pieces of synchronized information data is decoded.

5. A digital data transmission method according to claim 1, further comprising the step of:

adding a synchronizing signal and an error correcting code to each of the synchronizing blocks.

6. A digital data transmission method according to claim 1, further comprising the steps of:

judging whether the existence information or the no-existence information exists in a current piece of synchronized information data currently transmitted as one of the pieces of synchronized information data;

decoding the particular piece of compressed information data and other pieces of compressed information data subsequent to the particular piece of compressed information data of the current piece of synchronized information data in sequence from the head address of the particular compressed information data in cases where the existence information exists in the current piece of synchronized information data; and decoding a rear part of a piece of compressed information data existing in the current piece of synchronized information data after a head portion of the compressed information data existing in a preceding piece of synchronized information data transmitted previous to the current piece of synchronized information data is decoded in cases where the no-existence information exists in the current piece of synchronized information data.

7. A digital data transmission method comprising the steps of:

coding pieces of partial information data having the same data length to produce pieces of compressed information data having different data lengths, each of the compressed information data being composed of a piece of important compressed data and a piece of ordinary compressed data subsequent to the important compressed data;

allocating the pieces of compressed information data in a plurality of synchronizing blocks having the same synchronizing data length in coding order of the compressed information data to produce a piece of synchronized information data for each of the synchronizing blocks, the pieces of synchronized information data having the same data lengths, and each piece of synchronized information data being composed of one or more pieces of compressed information data or a rear part of a piece of ordinary compressed information data;

adding a synchronizing signal to each of the synchronized information data;

judging whether or not a particular piece of compressed information data having a head address exists in each of the pieces of synchronized information data; arranging pieces of important compressed data of the particular piece of compressed information data and other pieces of compressed information data subsequent to the particular piece of compressed information data at an important synchronizing area just after a synchronizing signal area of the synchronizing signal in each of one or more first particular synchronizing blocks in which the particular piece of compressed information data having the head address exists;

arranging pieces of ordinary compressed data of the particular piece of compressed information data and the other compressed information data at an ordinary synchronizing area subsequent to the important synchronizing area in each of the first particular synchronizing blocks;

arranging a rear part of a piece of ordinary compressed information data at an ordinary synchronizing area just after a synchronizing signal area of the synchronizing signal in each of one or more second particular synchronizing blocks in which the particular compressed information data having the head address does not exist; and transmitting first particular pieces of synchronized information data of the first particular synchronizing blocks and second particular pieces of synchronized information data of the second particular synchronizing blocks.

8. A digital data transmission method according to claim 7, additionally including: storing a compressed data number code, which indicates the number of compressed information data existing in each of the first particular synchronizing blocks, subsequently to the existence information.

9. A digital data transmission method according to claim 7, additionally including:

storing an ending code for indicating an end of the important synchronizing area at an end of the important synchronizing area.

10. A digital data transmission method according to claim 7, additionally including:

reproducing the important compressed data in each of the first particular pieces of synchronized information data; and decoding the important compressed data reproduced to form a frame of a picture.

11. A digital data transmission method according to claim 7, further comprising the steps of:

adding an error correcting code to each of the synchronizing blocks.

12. A digital data transmission method according to claim 11, additionally including: storing an additional error correcting code to delete a transmission error undesirably occurring in the important compressed data after the important compressed data.

13. A digital data transmission method according to claim 7, additionally including:

storing a piece of existence information indicating the existence of the important compressed data in each of the first particular synchronizing blocks;

storing both a piece of address pointing information indicating a particular position of a head address of the important compressed data and a piece of positional information indicating a data position of the important compressed data in each of the first particular synchronizing blocks; and storing a piece of no-existence information indicating that any piece of important compressed data does not exist in each of the second particular synchronizing blocks.

14. A digital data transmission method according to claim 13, additionally including:

reproducing each of the first particular pieces of synchronized information data in which the existence information, the address pointing information, the positional information and the important compressed information data are included;

recognizing the existence of the important compressed data in each of the first particular pieces of synchronized information data according to the existence information;

recognizing the data position of the important compressed information data in each of the first particular pieces of synchronized information data according to the positional information;

recognizing the particular position of the head address of the important compressed data in each of the first particular pieces of synchronized information data according to the address pointing information; and decoding the important compressed data of each of the first particular pieces of synchronized information data from the head address of the important compressed data.

15. A digital data transmission method according to claim 13, further comprising the steps of:

placing the existence information between the synchronizing signal area and the important synchronizing area;

placing the address pointing information and the positional information between the existence information and the important compressed data; and placing the no-existence information between the ordinary synchronizing area and the synchronizing signal area.

16. A digital data transmission apparatus, comprising:

coding means for coding pieces of partial information data having the same data length to produce pieces of compressed information data having different data lengths;

allocating means for allocating the pieces of compressed information data coded by the coding means in a plurality of synchronizing blocks having the same synchronizing data length in coding order of the compressed information data to produce a piece of synchronized information data for each of the synchronizing blocks, the pieces of synchronized information data having the same data lengths, and each piece of synchronized information data being composed of one or more pieces of compressed information data or a rear part of a piece of compressed information data;

starting position detecting means for detecting a head address of a particular piece of compressed information data allocated by the allocating means as a starting position in each of the synchronizing blocks, producing a piece of existence information indicating the existence of the head address of the particular piece of compressed information data for each of one or more first particular pieces of synchronizing blocks in cases where the head address of the particular piece of compressed information data is detected, producing both a piece of address pointing information indicating a particular position of the head address of the particular compressed information data and a piece of positional information indicating a data position of the particular piece of compressed information data for each of the first particular pieces of synchronizing blocks in cases where the head address of the particular piece of compressed information data is detected, and producing a piece of no-existence information indicating no-existence of the head address of the particular compressed information data for each of one or more second particular pieces of synchronizing blocks in cases where the head address of the particular piece of compressed information data is not detected;

auxiliary memory means for storing the existence information, the address pointing information and the positional information produced by the starting position detecting means in each of the first particular pieces of synchronizing blocks and storing the no-existence information produced by the starting position detecting means in each of the second particular pieces of synchronizing blocks;

main memory means for storing the particular piece of compressed information data of which the head address is detected by the starting position detecting means and one or more pieces of succeeding compressed information data subsequent to the particular piece of compressed information data in each of the first particular pieces of synchronizing blocks and storing a rear part of a piece of compressed information data in which any head address is not detected by the starting position detecting means in each of the second particular pieces of synchronizing blocks, a bit length of the rear part of the compressed information data being longer than a total bit length of the particular piece of compressed information data and the succeeding pieces of compressed information data by a bit length of both the address pointing information and the positional information; and memory reading control means for reading out first particular pieces of synchronized information data of the first particular pieces of synchronizing blocks in which the existence information, the address pointing information and the positional information stored by the auxiliary memory means and the particular piece of compressed information data and the succeeding pieces of compressed information data stored by the main memory exist in that order, reading out second particular pieces of synchronized information data of the second particular pieces of synchronizing blocks in which the no-existence information stored by the auxiliary memory means and the rear part of the compressed information data stored by the main memory exist in that order, and transmitting the first and second particular pieces of synchronized information data one after another.

17. A digital data transmission apparatus, comprising:

coding means for coding pieces of partial information data having the same data length to produce pieces of compressed information data having different data lengths;

allocating means for allocating the pieces of compressed information data coded by the coding means in a plurality of synchronizing blocks having the same synchronizing data length in coding order of the compressed information data to produce a piece of synchronized information data for each of the synchronizing blocks, the pieces of synchronized information data having the same data lengths, and each piece of synchronized information data being composed of one or more pieces of compressed information data or a rear part of a piece of compressed information data;

starting position detecting means for detecting a starting position of a particular piece of compressed information data allocated by the allocating means in each of the synchronizing blocks, producing a piece of existence information indicating the existence of the starting position of the particular piece of compressed information data for each of one or more particular pieces of synchronizing blocks, producing a piece of address pointing information indicating an address of the starting position, and producing a piece of positional information indicating a data position of the particular piece of compressed information data for each of the particular pieces of synchronizing blocks;

first memory means for storing the existence information, the address pointing information and the positional information produced by the starting position detecting means in each of the particular pieces of synchronizing blocks;

second memory means for storing pieces of important compressed data included in fore portions of the particular piece of compressed information data and one or more succeeding pieces of compressed information data subsequent to the particular piece of compressed information data in each of the particular pieces of synchronizing blocks;

third memory means for storing pieces of ordinary compressed data included in remaining portions of the particular piece of compressed information data and the succeeding pieces of compressed information data in each of the particular pieces of synchronizing blocks; and memory reading control means for reading out the existence information, the address pointing information and the positional information stored by the first memory means, the important compressed data stored by the second memory means and the ordinary compressed data stored by the third memory means in that order from each of the particular pieces of synchronizing blocks as a piece of synchronized information data, and transmitting the synchronized information data.

* * * * *